US010860968B1

(12) United States Patent
Iacono et al.

(10) Patent No.: US 10,860,968 B1
(45) Date of Patent: Dec. 8, 2020

(54) SYSTEM MANAGEMENT BASED ON DEVICE INFORMATION

(71) Applicant: DOORDASH, INC., San Francisco, CA (US)

(72) Inventors: Jeffrey Frank Iacono, San Francisco, CA (US); Fion Lam, San Francisco, CA (US); Dane Rowland Johnson, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 771 days.

(21) Appl. No.: 15/636,863

(22) Filed: Jun. 29, 2017

(51) Int. Cl.
 *G06Q 10/08* (2012.01)

(52) U.S. Cl.
 CPC .................... *G06Q 10/083* (2013.01)

(58) Field of Classification Search
 CPC .................... G06Q 10/0834; G06Q 10/08
 See application file for complete search history.

(56) References Cited

U.S. PATENT DOCUMENTS

| 6,675,153 | B1 | 1/2004 | Cook et al. |
| 8,275,359 | B2 | 9/2012 | Drennan |
| 9,020,536 | B1* | 4/2015 | Crossno ............. G06Q 10/0833 |
| | | | 455/456.1 |
| 10,248,120 | B1* | 4/2019 | Siegel ................. G01C 21/3602 |
| 2009/0099898 | A1* | 4/2009 | Ehrman .................. G06Q 10/06 |
| | | | 705/7.15 |
| 2009/0266722 | A1 | 10/2009 | Rogers et al. |
| 2011/0320034 | A1 | 12/2011 | Dearlove et al. |
| 2013/0132140 | A1 | 5/2013 | Amin et al. |
| 2014/0129951 | A1 | 5/2014 | Amin et al. |
| 2014/0149269 | A1 | 5/2014 | Kantarjiev et al. |
| 2014/0188750 | A1* | 7/2014 | Seiler ................. G06Q 10/0834 |
| | | | 705/335 |

(Continued)

FOREIGN PATENT DOCUMENTS

| WO | 01/11523 A1 | 2/2001 |
| WO | 2015/164264 A1 | 10/2015 |

OTHER PUBLICATIONS

Sonnek, Jason, Abhishek Chandra, and Jon Weissman. "Adaptive reputation-based scheduling on unreliable distributed infrastructures." IEEE Transactions on Parallel and Distributed Systems 18.11 (2007): 1551-1564. (Year: 2007).*
Notice of Allowance dated May 6, 2019, for U.S. Appl. No. 15/078,837, of Liu, X., et al., filed Mar. 23, 2016.
Non-Final Office Action dated May 29, 2019, for U.S. Appl. No. 14/811,924, of Wolter, J.A., et al., filed Jul. 29, 2015.

(Continued)

*Primary Examiner* — Scott M Tungate
(74) *Attorney, Agent, or Firm* — Mattingly & Malur, PC

(57) ABSTRACT

In some examples, a service computing device may receive, from respective mobile devices of a plurality of mobile devices, an indication of a communication availability condition of each respective mobile device. The service computing device may determine, for a delivery job, based at least in part on the indication of the communication availability condition received from each of the respective mobile devices, that a first mobile device of the plurality of mobile devices is likely to have a greater communication availability for a duration of the delivery job than a second mobile device of the plurality of mobile devices. Based at least partially on the determination, the service computing device may send, to the first mobile device, a communication to assign the delivery job to a courier associated with the first mobile device.

22 Claims, 10 Drawing Sheets

(56) References Cited

U.S. PATENT DOCUMENTS

| | | |
|---|---|---|
| 2015/0120602 A1 | 4/2015 | Huffman et al. |
| 2016/0063435 A1 | 3/2016 | Shah et al. |
| 2016/0071050 A1 | 3/2016 | Kaye |
| 2016/0086255 A1* | 3/2016 | Sainfort ............. G06Q 30/0637 705/26.41 |
| 2016/0223345 A1 | 8/2016 | Thakur et al. |
| 2016/0232489 A1 | 8/2016 | Skaaksrud |
| 2016/0328781 A1 | 11/2016 | Patel-Zellinger et al. |
| 2017/0046644 A1 | 2/2017 | Zhang et al. |
| 2017/0116570 A1 | 4/2017 | Schroeder et al. |
| 2017/0147951 A1 | 5/2017 | Meyer et al. |
| 2018/0025407 A1 | 1/2018 | Zhang et al. |

OTHER PUBLICATIONS

Final Office Action dated May 30, 2019, for U.S. Appl. No. 15/081,113, of Bhorania, J., et al., filed Mar. 25, 2016.
Final Office Action dated Jun. 3, 2019, for U.S. Appl. No. 15/081,066, of Bhorania, J., et al., filed Mar. 25, 2016.
Non-Final Office Action dated Mar. 8, 2018, for U.S. Appl. No. 14/811,924, of Wolter, J.A., et al., filed Jul. 29, 2015.
Non-Final Office Action dated Oct. 18, 2018, for U.S. Appl. No. 15/081,066, of Bhorania, J., et al., filed Mar. 25, 2016.
Non-Final Office Action dated Oct. 23, 2018, for U.S. Appl. No. 15/081,113, of Bhorania, J., et al., filed Mar. 25, 2016.
Final Office Action dated Nov. 2, 2018, for U.S. Appl. No. 14/811,924, of Wolter, J.A., et al., filed Jul. 29, 2015.
Non-Final Office Action dated Nov. 28, 2018, for U.S. Appl. No. 15/078,837, of Liu, X., et al., filed Mar. 23, 2016.

* cited by examiner

SYSTEM MANAGEMENT BASED ON DEVICE INFORMATION

BACKGROUND

The crowdsourcing economy enables people to perform services using their own electronic devices as a communication link to a service and/or to customers of the service. For example, a person may act as a courier for delivering an item to a buyer on behalf of a service provider. The courier may use the courier's electronic device to receive notice from the service provider of an order for an item. The courier may pick up the item from a specified location and may deliver the item to another location specified by the buyer. The courier may be compensated for performing this service. While the courier is performing this service, the service provider may want to ensure that it is able to communicate with the courier's electronic device at least for certain occurrences while the courier is fulfilling the delivery.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
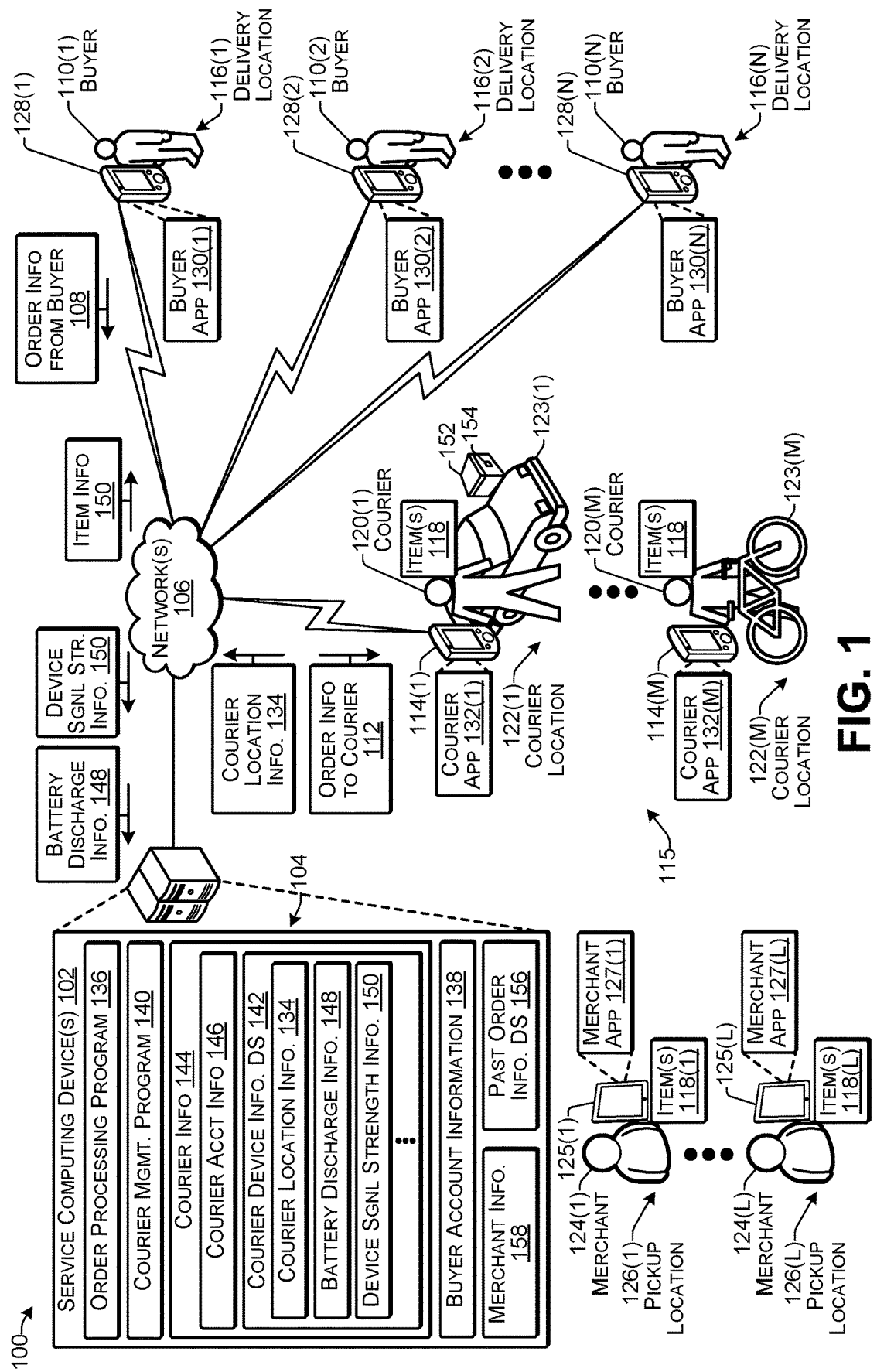
FIG. 1 illustrates an example system that may be managed based on courier device information according to some implementations.

The technology herein provides a system including a distributed system of mobile computing devices in communication with one or more service computing devices with improved functionality that enables the service computing device to maintain communication with the mobile devices during various stages of providing a service. Through the interaction of the service computing device with a courier application installed on the respective mobile devices, the service computing device is able to determine if communication is likely to be lost with particular ones of the mobile devices during performance of a delivery job, and may take one or more actions to prevent such loss of communication, thereby improving the function of the system. Accordingly, the system herein may determine the predicted continued availability of communications with the courier devices when selecting a particular courier device for performing a particular delivery job.

In some implementations, each mobile device of a plurality of mobile devices may have a respective instance of a courier application installed thereon, which configures the mobile device as a particular device able to perform the specific functions described herein. Each mobile device may be associated with a courier who may interact with the courier application when providing a courier service.

In some examples, the courier application may monitor the battery power level of a mobile device of a courier for determining expected communication availability of the mobile device. For example, the courier application on the mobile device may access a power management circuit, such as a power management integrated circuit, to determine the current remaining power level of the battery. When the remaining power level of the battery reaches a first threshold, the service computing device may receive an indication of the remaining power level from the courier application. In response, the service computing device may send an instruction to cause the courier application to present a warning message on a display of the mobile device indicating that the courier will receive no additional job assignments if the battery power level drops below a second threshold. Alternatively, in other examples, the warning message may be generated by the courier application independently of the service computing device upon detecting the battery power level reaching the first threshold.

Subsequently, if the battery power level continues to discharge, and reaches a second threshold, the courier application may send an indication of the remaining power level of the battery to the service computing device. In response, the service computing device may not assign any additional delivery jobs to the courier, such as until the battery power level of the mobile device is detected as being above the second threshold. In addition, the service computing device may cause the courier application to present a message on the display of the mobile device indicating that the courier needs to charge the battery before receiving additional job assignments. Alternatively, the courier application may be configured to present the message automatically upon detecting that the battery power level has fallen below the second threshold.

Additionally, in some examples, the courier application may detect the charging state of the mobile device. For example, if the battery power level is below the second threshold, but is above a third threshold, and detected to be currently charging, e.g., in the car of the courier or the like, then the courier application may send this information to the service computing device. In response, based on the battery power level being above the third threshold and the charging state of the battery of the mobile device being detected as currently charging, the service computing device may resume assigning delivery jobs to the courier.

In addition, the service computing device may take into account the model of the courier's mobile device, the age of the courier's mobile device, the prior battery discharge information for the courier's mobile device, and the like, when calculating the first and/or second threshold for the particular mobile device. For example, during the performance of past deliveries, the particular courier's mobile device may have been determined to discharge the battery power more quickly than other types of mobile devices. Accordingly, the first threshold and/or the second threshold may be custom set for the particular mobile device at a higher percentage of the remaining battery power than for other mobile devices associated with other couriers, such as mobile devices having newer batteries, larger capacity batteries, slower battery discharge rates, etc. The service computing device may maintain a courier device information data structure that stores past battery discharge information for each mobile device, mobile device brand and model information, calculated first and second low battery power level thresholds, as well as other information, such as cellular carrier, cellular signal strength measured at various geographic locations during deliveries, frequency with which the courier application crashes, operates improperly, or otherwise fails on the particular courier device, and so forth.

In some examples, different courier mobile devices that are different brands and/or different models of mobile devices may be treated differently, such as depending on the past usage data for these mobile devices as collected by the service computing device over time. For example, the courier application on the each mobile device may be configured to detect the brand of the mobile device, the model of the mobile device, a cellular carrier, and the like, of the mobile device. This information may be correlated with battery discharge rates for each of the mobile devices such as determined from the courier device information data structure maintained by the service computing device, e.g., for determining expected battery discharge rates for particular brands and models of mobile devices.

As another example, when the battery power level is detected as being below the first threshold, the service provider may consider an amount of time that a delivery job is predicted to require for completion when determining whether to assign the particular delivery job to the particular courier associated with the mobile device that is below the first threshold or second threshold. For example, if the job is predicted to take 40 minutes, the service computing device may select a different courier to perform the job, whereas if the job is predicted to take 10 minutes, the service computing device may assign the job to the courier with the low battery. For instance, the service computing device may estimate the time remaining for the particular courier mobile device before the battery is fully depleted, and may only assign jobs to the particular courier if the delivery job can be completed within the predicted time and within a level of confidence before the battery of the mobile device is depleted.

In some examples, the service computing device may also take into consideration the cellular signal strength and the existence of any dead zones for the courier's cellular carrier when assigning a particular delivery job to a particular courier. For instance, if the merchant pickup location or the buyer delivery location for a particular order is located in a known dead zone for a particular cellular carrier used by a first courier, but a different carrier used by a second courier has better service in the area, the service computing device may assign the delivery job to the second courier rather than to the first courier. In some examples, the presence of a dead zone may be determined based on signal strength information received from the courier device in the past, and/or from other courier devices that use the same cellular carrier. Additionally, or alternatively, the courier management program may access coverage maps of one or more cellular carriers to determine any dead zones from the coverage maps.

If the courier management program determines that the first courier device may be without cellular service for a portion of the route of the delivery job, while the second courier devices is expected to have cellular service for the entire route of the delivery job, the courier management program may select the second courier to perform the delivery job. For example, the service computing device may select a courier device that is expected to be available to communicate with the service computing device during the entire duration of the delivery job, i.e., from the time that the courier accepts the delivery job until the delivery is completed.

Additionally, such as in the case that the merchant pickup location is located in the cellular dead zone, a merchant application on a merchant device may be configured to detect the arrival of the courier at the pickup location, such as through a direct Bluetooth or Wi-Fi communication with the courier application on the courier device. Based on detecting the arrival of the courier, the merchant application may send a communication to the service provider over a functioning wired or wireless network, such as the merchant's Wi-Fi network, or the like, to inform the service provider that the courier has arrived at the merchant pickup location. Similarly, when the courier departs from the merchant pickup location with the item, the merchant application may send another communication to the service provider to inform the service provider that the item is out for delivery to the buyer location. Further, in some cases, the merchant device may be configured by the merchant application to perform the above-discussed functions regardless of whether the merchant is located in a cellular dead zone or not. Additionally, in the examples in which the buyer delivery location is in a cellular dead zone, the buyer application may be configured to use the buyer's local Internet connection to send a message to the service computing device when the courier arrives at the delivery location, and/or to send another message to the service computing device when the courier departs from the delivery location.

Further, in some implementations, the service computing device may take into consideration the reliability of each courier's mobile device when selecting a courier to assign to a particular delivery job. For example, if a first courier's mobile device crashes or otherwise fails often, the service computing device may select a second courier over the first courier when determining which courier to offer a particular delivery job based at least in part on predicting that the availability of the second courier mobile device will be greater than that of the first courier mobile device. The communication availability determination may take into account a number of factors including battery level, likelihood of dead zones, likelihood of application failure, likelihood of device failure, and so forth.

In some examples, a service provider may provide a delivery service that enables buyers to order items, such as food items, that are delivered by couriers. A buyer may use a buyer application on a buyer device, such as a mobile device or other computing device, to order one or more items for delivery to the buyer's delivery location. In the examples herein, an order may include a request submitted by a buyer (e.g., a customer) for the acquisition of an item to be delivered by a courier. The order information may be received by the service provider and may be sent by the service provider to the courier. A merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases or otherwise orders an item delivered by a courier. Buyers may include customers and potential customers. The service provider may provide payment to the merchant for the picked up items, provide payment to the courier for delivering the items, and may receive payments from the buyers for the delivered items.

For discussion purposes, some example implementations are described in the environment of managing a network of mobile devices for ensuring communications with the couriers are maintained at desired stages of a delivery job. However, implementations herein are not limited to the particular examples provided, and may be extended to other service environments, other system architectures, other techniques for selecting couriers, and so forth, as will be apparent to those of skill in the art in light of the disclosure herein.

FIG. 1 illustrates an example system 100 that may manage a distributed network of courier devices based on device information according to some implementations. The system 100 includes one or more service computing devices 102 of a service provider 104 that may receive, over one or more networks 106, order information 108 from one or more of a plurality of buyers 110(1), 110(2), . . . , 110(N). The order information 108 may include information about at least one order placed by at least one of the buyers 110. Based on the order information 108 received from a particular buyer 110, the service computing device 102 may send order information 112 to a selected courier device 114 of a distributed network 115 of a plurality of courier devices 114(1)-114(M). As one example, when a buyer 110(1), 110(2), . . . , 110(N) wishes to place an order, the service computing device 102 may first determine a respective delivery location 116(1), 116(2), . . . , 116(N) of the respective buyer 110(1), 110(2), . . . , 110(N) to which the order is to be delivered. Further, the selected courier device 114 may be selected based on one or more conditions determined for the courier device 114 and indicative of predicted availability of the courier device 114 during the delivery job, as discussed additionally below.

In the illustrated example, the service computing device 102 of the service provider 104 is able to communicate with the plurality of courier devices 114(1)-114(M) over the one or more networks 106. Each courier device 114(1)-114(M) may be associated with a respective courier 120(1)-120(M). Additionally, a respective courier location 122(1)-122(M) of each respective courier device 114(1)-114(M) (and thereby presumably the location of the respective courier 120(1)-120(M)) may be determined from a GPS receiver (not shown in FIG. 1) associated with each respective courier device 114, or from other types of location sensors.

Further, at least some of the couriers 120(1)-120(M) may use vehicles 123(1)-123(M) when making deliveries. Examples of vehicles 123 may include automobiles, bicycles, scooters, motorcycles, and so forth. The vehicle type used by the courier may be indicated in courier account information, may be indicated by the courier at the start of a shift, e.g., via the courier device 114, and/or may be detected by the service computing device 102, such as from how fast the courier is traveling, stop and go movement patterns, and other pattern detection. In some cases, the type of vehicle 123 associated with a courier may be taken into consideration when determining delivery travel times and when selecting a particular courier for fulfilling a particular delivery job.

In some examples, merchants 124(1)-124(L) may each offer one or more respective items 118(1)-118(L). Each merchant 124(1)-124(L) may be associated with a respective merchant device 125(1)-125(L) that the merchant may user as a point of sale (POS) terminal for conducting transactions for the sale of items 118 to customers, and that the merchant may further use for communication with the service computing device 102, such as for receiving orders for delivery. Each merchant 124(1)-124(L) may be associated with a respective pickup location 126(1)-126(L), which may typically be the merchant's place of business, at which a courier 120 may pick up one or more of the items 118 from the respective merchant 124 for delivery to a buyer 110. In addition, each merchant device 125(1)-125(L) may have an instance of a merchant application 127 installed thereon to configure the merchant device 125 as a particular machine for perform as a POS device, and for further enabling interaction with the service computing device 102 for receiving delivery orders from the service computing device 102, presenting the orders to the merchant 124, and notifying the merchant 124 of the location of the courier 120 who will be picking up the delivery order.

The service computing device 102 may send the order information 112 for the order to the selected courier device 114 of the selected courier 120. In response, the selected courier 120 may respond by acknowledging receipt of the order information and by proceeding to a merchant pickup location 126 of a merchant 124 who will provide the item 118 ordered by the buyer 110. Additionally, a spoilage time may be associated with each item 118. The spoilage time may be the time between when an item 118 is ready to be picked up from the merchant and when the item 118 is considered to be of degraded quality, e.g., cold, soggy, melted, wilted, oxidized, or otherwise less palatable than would be normally expected by the buyer. As discussed additionally below, the system 100 herein may include item transportation containers (not shown in FIG. 1) having insulation and temperature control devices for extending the spoilage times of particular items 118.

In addition, the buyers 110(1), 110(2), . . . , 110(N) may be associated with respective buyer devices 128(1), 128(2), . . . , 128(N) that may execute respective instances of buyer applications 130(1), 130(2), . . . , 130(N). For example, buyers 110 may use the buyer devices 128, such as smart phones, tablet computers, wearable computing devices, laptops, desktops, or the like, and these buyer devices 128 may have installed thereon the buyer application 130. The buyer application 130 may enable the respective buyer 110 to purchase one or more of the items 118 to be delivered to the buyer 110 by one of the couriers 120. For example, the buyer application 130 may present one or more graphic user interfaces (GUIs) on a display of the buyer device 128 for enabling the buyer 110 to select and order an item 118.

In some examples, the buyer application 130 may enable the buyer 110 to make a payment for an order using the buyer application 130. For instance, the service provider 104 may charge a buyer account associated with the buyer 110 for an amount corresponding to a particular order. In some examples, the buyer application 130 and the service computing device 102 may communicate with each other via one or more APIs (application programming interfaces). Additionally, or alternatively, the buyer application 130 may include a web browser, or the like, and the buyer 110 may navigate to a website associated with the service provider 104. In this case, the buyer 110 may use the website associated with the service provider 104 to place an order, and the website may provide at least some of the functionality attributed to the buyer application 130 herein.

In addition, each respective courier device 114(1)-114(M) may execute a respective instance of a courier application 132(1)-132(M). For example, the couriers 120 may use any various types of mobile devices as the courier devices 114, such as smart phones, tablet computers, wearable computing devices, laptops, or the like, and these courier devices 114 may have installed thereon an instance of the courier application 132 which configures the mobile device as a courier device able to perform the functions described herein. The courier application 132 may configure the courier device 114 to receive the order information 112 from the service computing device 102 to provide a user interface to a particular courier 120 with information for delivering a particular order to a buyer delivery location 116. The courier application 132 may further present a user interface to enable the courier 120 to respond to the service computing device 102 to confirm acceptance of a delivery job and to subsequently provide an indication of completion of a delivery job when the delivery has been made.

The courier application 132 on the courier device 114 may configure the courier device 114 to send communications to the service computing device 102 during various stages of the delivery job. For example, when the courier 120 first accepts the delivery job, the courier 120 may interact with an interface presented by the courier application 132 to acknowledge receipt of the delivery job and to indicate that the courier 120 will be carrying out the assigned delivery job. Subsequently, the courier application 132 may periodically send courier location information 134 to indicate the location of the courier device 114 to the service computing device 102, such as based on GPS information obtained from a GPS receiver on the courier device 114, so that the service computing device 102 may track the progress of the courier 120 to the merchant pickup location 126. In addition, after the courier 120 picks up the item 118 from the merchant pickup location 126, the courier application 132 may provide a communication to the service computing device 102, indicating that the item 118 has been picked up and that the courier 120 is traveling to the buyer delivery location 116 with the item 118.

In some examples, the courier application 132 may present a user interface on a display of the courier device 114 to enable the courier 120 to manually indicate that the item 118 is out for delivery. In addition, the courier device 114 may continue to send the location of the courier device 114 to the service computing device 102 periodically so that the service computing device 102 may track the progress of the courier 120 toward the delivery location 116 of the buyer 110, and to enable the service computing device 102 to provide the buyer 110 with an update as to the status and expected delivery time of the item 118.

Furthermore, when the courier 120 arrives at the delivery location 116, the courier application 132 may communicate with the service computing device 102 to indicate that the courier 120 is at the delivery location 116. For example, a prompt on the user interface presented by the courier application may be selected by the courier 120 to indicate that the courier 120 has arrived at the delivery location 116. In response, the service computing device 102 may send a notification to the buyer device 128 to inform the buyer 110 that the courier 120 has arrived at the delivery location 116. After the courier 120 has completed the delivery, the courier application 132 may send a communication to the service computing device 102 indicating that the delivery job has been completed and that the courier 120 is available for another delivery job. In some examples, the courier application may present a prompt in the user interface of the courier application to enable the courier to manually send an indication that the delivery job has been completed and that the courier is available for a another delivery job.

In the above stages, of the delivery job, if the courier device 114 fails or is otherwise unable to communicate with the service computing device 102, such as due to the being an geographic area in which cellular radio service does not provide a sufficient signal for communication, i.e., a dead zone, then one or more of the above stages might not be able to be completed, which may jeopardize completion of the delivery job. Accordingly, to avoid an undesirable result, implementations herein determine the predicted availability of the courier device for the duration of the delivery job, such as based on remaining battery power level, the cellular carrier of the courier device, any known dead zones for the particular carrier, and the reliability of the particular courier device when executing the courier application, such as the likelihood of the a failure of the courier application on the courier device and/or the likelihood of a failure of the device itself.

In the illustrated example, the service computing device 102 includes an order processing program 136 that may be executed by the service computing device 102 to provide, at least partially, the order processing functionality attributed to the service computing device 102. The order processing program 136 may receive the order information 108 from the buyers 110 and may associate the order information 108 with buyer account information 138 that is maintained by the service computing device 102. For instance, based on buyer identifying information that may be included with the order information 108, such as a buyer account identifier, a buyer name, or the like, the order processing program 136 may associate particular order information 108 with a particular buyer account in the buyer account information 138. The order processing program 136 may access a buyer account determined from the buyer account information 138 to charge a particular buyer account for a particular order.

Furthermore, the order information 108 received from the buyer may indicate the buyer delivery location 116. As one example, the buyer delivery location 116 may be determined by the buyer application 130 from a GPS receiver associated with the buyer device 128. The buyer application 130 may use this location information as the delivery location 116 for a particular order. In other examples, the buyer 110 may manually enter an address into the buyer application 130 that may be used as the delivery location 116 for an order. The buyer application 130 may store the delivery location 116 used for a past order so that the buyer 110 does not have to reenter the delivery location 116 for a subsequent order.

In response to receiving an order from a buyer device 128, the order processing program 136 may request that a courier management program 140 determine a courier 120 to deliver the order. For instance, the courier management program 140 may select a particular courier 120 to perform the delivery job based at least partially on courier location and further based at least partially on a predicted availability of communications with the corresponding courier device 114 of the selected courier 120 for a duration of the delivery job, e.g., from the time that the courier accepts the delivery job through the time when the delivery job is completed.

In some examples, the courier management program 140 may determine the predicted communication availability of the courier device 114 based at least partially on a remaining battery power level of the courier device 114. For instance, the courier application 132 may monitor the battery power level of a courier device 114. For example, the courier application 132 may access a power management circuit, such as a power management integrated circuit (PMIC), on the courier device 114 to determine the current remaining power level of the battery.

The courier application 132 may periodically send the remaining power level of the battery to the service computing device 102, which may store the determined battery power level along with a timestamp in a courier device information data structure 142. For instance, the courier management program 140 may maintain courier information 144 including the courier device information data structure 142 and courier account information 146. The courier account information 146 may include information about each courier, such as contact information, financial account information, and the like.

In addition, the courier device information data structure 142 may include information received from or otherwise determined about each courier device 114, such as the courier location information 134 collected over time, device battery information 148 collected over time, device signal strength information 150 collected over time, and numerous other types of information, as discussed additionally below. The courier management program 140 may use information received from a particular courier device, and also may use information received from other courier devices, when determining a communication availability of the particular courier device for a particular delivery job.

In the example of determining future communication availability based at least partially on battery level, when the remaining power level of the battery reaches a first threshold, the courier management program 140 may receive an indication of the remaining power level from the courier application 132. In response, the courier management program 140 may send an instruction to cause the courier application 132 to present a battery warning message on a display of the courier device 114 indicating that the courier will receive no additional job assignments if the battery power level drops below a second threshold. Alternatively, in other examples, the warning message may be generated by the courier application 132 independently of the courier management program 140, such as upon the courier application 132 detecting the battery power level reaching the first threshold.

In some examples, the courier management program 140 may also take into consideration the cellular signal strength of a cellular carrier used by the courier device 114 when predicting communication availability for assigning a delivery job. For instance, if the merchant pickup location 126 or the buyer delivery location 116 for a particular order is located in a geographic region that is a dead zone for a particular carrier used by a first courier device 114(1), but a different carrier used by a second courier device 114(2) has better service in the geographic region, the courier management program 140 may assign the delivery job to the second courier, rather than to the first courier.

Additionally, such as in the case that the merchant pickup location is located in the dead zone, the merchant application 127 on the merchant device 125 may be configured to detect the arrival of the courier at the pickup location such as through a BLUETOOTH® or Wi-Fi communication. For instance, the courier application 132 and the merchant application 127 may be configured to communicate with each other when within range of such short range radio and may automatically exchange identifiers, such as application serial number identifiers, device serial number identifiers, courier/merchant identifiers, delivery job identifiers, or the like, to confirm an identity of the courier as being present at the merchant pickup location 126. As one example, the merchant application 127 may receive information about the assigned courier from the service computing device 102, and may match this information with information obtained from the courier device 114 when the courier device 114 comes within short range radio range.

Based on detecting the arrival of the courier device 114 assigned to a particular order, the merchant application 127 may send a communication to the service computing device 102 over a wired or wireless Internet connection, such as Wi-Fi, or the like, to inform the order processing program 136 and/or the courier management program 140 that the courier 120 has arrived at the merchant pickup location 126. Similarly, when the courier 120 departs from the merchant pickup location 126 with the ordered item 118, the merchant application 127 may send another communication to the service computing device 102 to inform the service provider 104 that the item 118 is out for delivery to the buyer location 116. In some examples, the merchant application 127 may perform this function regardless of whether the merchant pickup location 126 is in a carrier dead zone.

Similarly, the buyer application 130 on a buyer device 128 may also have a courier detection feature to detect the courier device 114 when the courier 120 arrives at the buyer delivery location 116. For instance, similar to the merchant application example discussed above, the buyer application may establish communication with the courier device 114 via short range radio when the courier device 114 comes within range of the buyer device 128. The buyer device may send a first communication to the service computing device 102 when the courier device is detected as arriving at the buyer delivery location 116, and may send a second communication when the courier device 114 is detected as leaving the buyer delivery location 116.

Furthermore, the courier application 114 may be configured to cache information, such as map information, buyer delivery location, and so forth, when the courier is expected to pass through a known cellular dead zone for the carrier of the courier. For example, the courier management program 140 may identify, such as based on past delivery jobs performed by the same courier, or performed by other couriers using the same cellular carrier, or so forth, that the courier will be passing into a dead zone for pickup or delivery of an item. Accordingly, the courier management program 140 may ensure that the courier device 114 receives all necessary information prior to reaching the dead zone, such as map information, merchant pickup location, buyer delivery location, and so forth, and may store this information on the courier device 114. Thus, when the courier enters the dead zone, the courier application 132 may use the stored information instead of receiving information in real time.

As another example, the service computing device may track the reliability of the courier device 114 for determining the likely communication availability of the courier device 114 for determining whether to assign a delivery job to a particular courier. For example, if a first courier's mobile device crashes often and/or the courier application is not functioning properly, the courier management program 140 may select a second courier whose mobile device is expected to function more reliably during the delivery job.

The courier management program 140 may use the above-discussed communication availability factors for selecting a courier for a delivery job. The selected courier 120 may use the courier application 132 on the courier device 114 to receive a message with order information 112, and to respond with a reply message indicating acceptance of the delivery job. The selected courier 120 may subsequently pick up the ordered item(s) 118 from the merchant pickup location 126 and deliver the ordered item(s) 118 to the particular buyer 110 at the indicated delivery location 116. When the courier 120 has completed delivery of the item(s) 118 to the delivery location 116, the courier 120 may use an interface presented by the courier application 132 to inform the order processing program 136 that the delivery has been completed. The order processing program 136 may access a courier account indicated in the courier account information 146 for the selected courier 120 to credit the courier account of the selected courier 120 with payment for the delivery job.

Additionally, the courier 120 may be able to turn on and of the functionality of the courier application 132, such as when the courier desires to work as a courier (i.e., is "active") and when the courier does not desire to receive delivery job assignments (i.e., is "inactive"), respectively. When the courier is active, the courier application 132 may periodically provide the service computing device 102 with an indication of a current location of a particular courier device 114. For instance, the courier application 132 may receive location information from one or more location sensors associated with each courier device 114. Based on this location information, the courier application 132 may send location information 134 to the service computing device 102. Accordingly, the service computing device 102 may receive an indication of a geographic location of each courier device 114 of each active courier 120. Thus, a subset of courier devices 114 associated with active couriers may communicate with the service computing device 102, and may send location information 134 obtained from one or more location sensors associated with each courier device 114, such as a respective GPS receiver (not shown in FIG. 1).

In some cases, another subset of courier devices 114 associated with inactive couriers may be periodically pinged by the service computing device 102 to determine interest in becoming active and, if so, requesting current location information of the associated inactive courier. Inactive couriers who are interested in being activated may allow their courier devices 114 to respond with their location information, while those who are not interested in being activated may keep their location information private by not responding. In some examples, the courier application 132 and the service computing device 102 may communicate with each other via one or more APIs. Alternatively, in other examples, the courier device 114 may receive the order information 112 via an SMS text message, a voicemail, a telephone call, or the like.

In addition, in some cases a courier may be required to have certain delivery equipment 152 available for performing certain types of deliveries, such as a cooler for delivering frozen food, e.g., ice cream, or an insulated warmer for delivering hot food. This delivery equipment 152 may be equipped with a passive or active radio communication device 154, such as an RFID tag or other near field communication (NFC) device. As a prerequisite to assigning a particular type of order to the particular courier 120, the courier application 132 may cause the courier device 114 to scan for the presence of the delivery equipment 152 by scanning for the presence of the radio communication device 154. If the delivery equipment 152 is detected, the courier 120 may be assigned the certain type of delivery corresponding to the delivery equipment 152. On the other hand, if the delivery equipment 152 is not present, the courier 120 might not be assigned that type of delivery, and/or the courier application 132 may present a message of the display of the courier device 114 to inform the courier 120 to retrieve the delivery equipment 152 if the courier 120 would like to be assigned to perform the certain types of deliveries.

Further, some couriers 120 may qualify as preferred couriers who may be selected for certain types of deliveries, such as larger orders. For example, after a courier has completed a threshold number of such larger orders successfully, the courier may be switched to a preferred status in the courier data structure and may be given higher priority for being selected for larger orders.

The order processing program 136 may store information associated with each order in a past order information data structure 156. For instance the past order information data structure 156 may include a day of the week, date, and time of day at which each order is received from the respective buyer 110 and delivered to the respective delivery location 116. The past order information data structure 156 may further include, for each order: buyer identifying information; item(s) ordered; the delivery location 116; merchant identifying information; the merchant pickup location 126; courier identifying information; the courier location 122 of the courier when the courier accepted the delivery job; time that the courier arrived at the merchant pickup location; time that the courier left the merchant pickup location; time that the courier arrived at the delivery location; time that the courier left the delivery location; amount paid for the order; any feedback from the buyer, including any complaints or indications of item spoilage; as well as other information, as discussed additionally below.

Furthermore, the service computing device 102 may maintain merchant information 158, which may include various information about the merchants 124 from which the items 118 are obtained. For instance, the merchant information 158 may include merchant account information; a number of each type of item obtained by the couriers 120 from each merchant 124 on each date; amount paid to each merchant for each item; as well as other information regarding the merchants 124, as discussed additionally below. As one example, the service provider 104 may provide electronic payment to the respective merchants 124 based on the number and price of each item 118 picked up by the couriers from the respective merchants 124.

The one or more networks 106 can include any appropriate network, including a wide area network, such as the Internet; a local area network, such an intranet; a wireless network, such as a cellular network; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the service computing device 102, the buyer devices 128, the merchant devices 125, and the courier devices 114 are able to communicate over the one or more networks 106 using wired or wireless connections, and combinations thereof.

Figure 2:
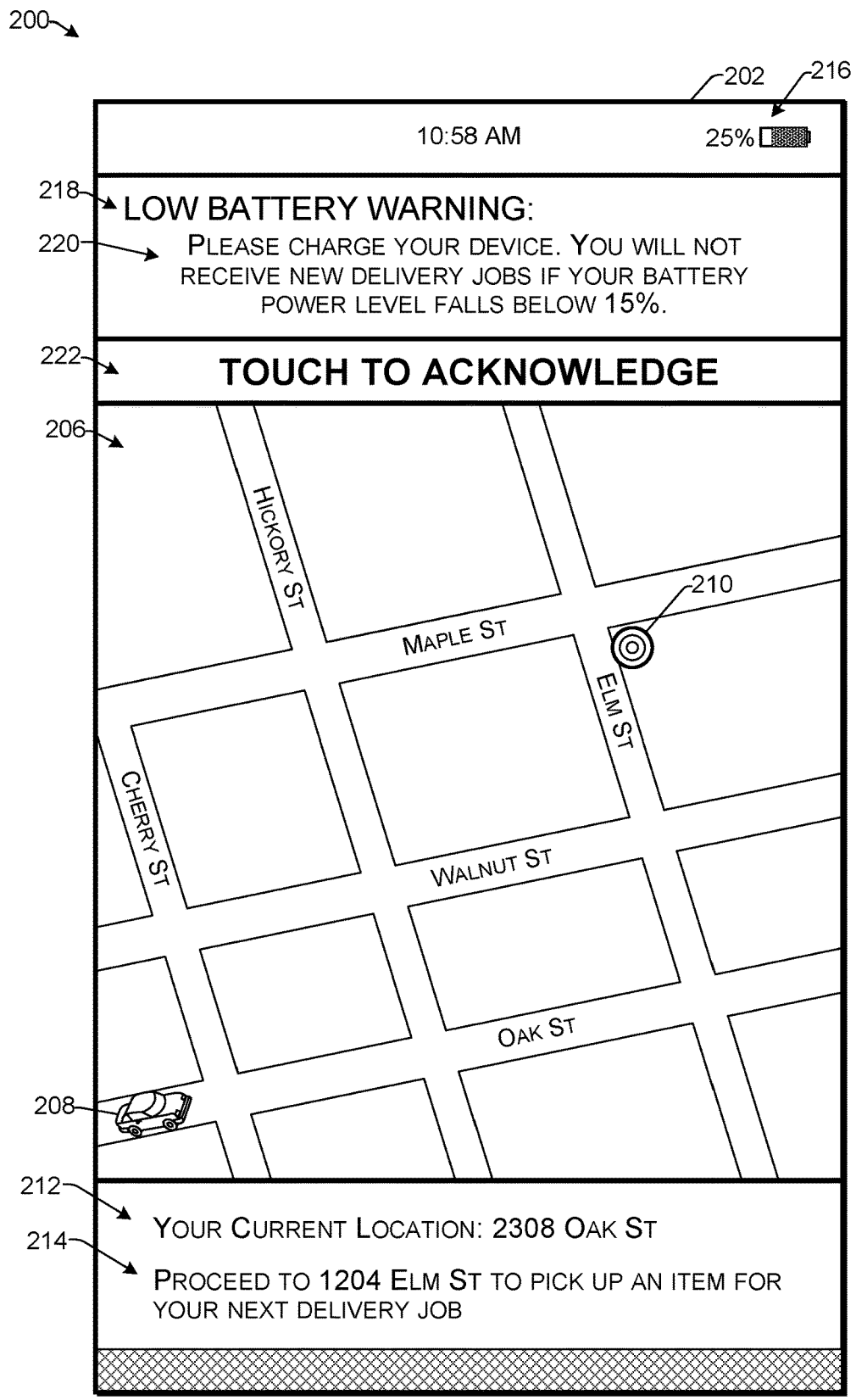
FIG. 2 illustrates an example courier interface enabling a courier to receive communications from the service computing device according to some implementations.

FIG. 2 illustrates an example GUI 200 that may be presented on a display 202 associated with the courier device 114 according to some implementations. The GUI 200 presents information, such as in-application communications which may be received from the service computing device, or which may be generated by the courier application locally. In the illustrated example, the GUI 200 includes a map 206 that may include a first icon 208 corresponding to a current indicated location of the courier, such as based on GPS information or other location information received from the courier device. The map 206 may further present a second icon 210 corresponding to a target location to which the courier may have been instructed to proceed, such as a merchant pickup location. The GUI 200 may further present a text indication 212 of the courier's current location and a destination instruction 214, or the like, such as in the case that the courier has accepted a delivery job and is proceeding to a merchant pickup location to pick up an item.

The GUI 200 may further include a battery power level indicator 216 that indicates a remaining battery power level for the courier device 114. As mentioned above, the courier application may access a power management circuit, the operating system, or other circuits or components (not shown in FIG. 2) on the courier device 114 to determine the remaining battery power level for the courier device, and may include the remaining battery power level indicator 216 on the GUI 200 based on the received battery power information. In addition, when the battery power level is detected to reach a first threshold, the courier application may present a low battery warning 218 in the GUI 200. The low battery warning 218 may include a message 220, such as to indicate that the courier will not be assigned new delivery jobs if the battery power level reaches a second threshold. Further, the GUI 200 may include an acknowledgement button 222 that the courier may select to acknowledge receipt of the low battery warning.

As mentioned above, in some examples, the first battery level threshold and/or the second battery level threshold may be custom set for individual courier devices. For example, if the average delivery job takes 30 minutes from courier acceptance to completion of delivery, the courier management program may calculate how quickly the battery on the particular device has depleted in the past while the courier application is executing on the particular courier device, and may set the first threshold at selected percentage of remaining battery power to ensure that the battery will not reach, e.g., the second threshold before 30 minutes has expired. The second threshold may be selected to ensure that sufficient battery life remains in case unforeseen circumstances may arise that may extend the length of time of the delivery job.

In addition, the courier management application may take into account the model of the courier's mobile device, the age of the courier's mobile device, in addition to the prior battery discharge information for the courier's mobile device when calculating the first and/or second threshold for the particular mobile device. For example, during the performance of past deliveries, the particular courier's mobile device may have been determined to discharge the battery power more quickly than other types of mobile devices. Accordingly, the first threshold and/or the second threshold may be custom set for the particular mobile device at a higher percentage of the remaining battery power than for other mobile devices associated with other couriers, such as mobile devices having newer batteries, larger capacity batteries, slower battery discharge rates, etc.

The service computing device may maintain the courier device information data structure 142 (see, e.g., FIG. 1) that stores past battery discharge information for each mobile device, mobile device brand and model information, past discharge rates, and so forth. The courier device information data structure may further include custom calculated first and second low battery power level thresholds for the particular courier device, as well as other information, such as cellular carrier, cellular signal strength measured at various geographic locations during deliveries, frequency with which the courier application crashes, operates improperly, or otherwise fails on the particular device, and so forth.

Alternatively, in some examples, the first threshold and/or the second threshold may be selected based on a brand and model of the courier device. For example, over time, the courier management program may receive battery discharge information from a large number of different brands and models of courier devices and may determine how quickly each different model of courier device uses battery power while the courier application is executing on the courier device. Thus, different courier devices that are different brands and/or different models of mobile devices may be treated differently, such as depending on the past usage data for these mobile devices as collected by the courier management program over time. For example, the courier application on the each courier device may be configured to detect the brand of the mobile device, the model of the mobile device, a cellular carrier, and the like, of the mobile device. This information may be correlated with battery discharge rates for each of the courier devices stored in the courier device information data structure maintained by the courier management program for determining expected battery discharge rates for particular brands and models of mobile devices. Accordingly, the courier management program may set the first and second thresholds based on the average battery depletion rate for the particular model of mobile device as determined over time from the large amount of battery usage information collected from the large number of courier devices in the distributed network of courier devices.

As still another example, the courier management program may apply a default first threshold and/or default second threshold that may be applied to some or all courier devices regardless of brand or model. In this case, the default first threshold and/or default second threshold may be set sufficiently high to ensure that a courier device battery is unlikely to be fully depleted during the execution of a delivery job. As one example, in the case of a new courier device, the courier management program may not have enough battery discharge information for the new device to apply custom first and second thresholds, and thus, may use the default thresholds until custom thresholds can be determined. Numerous other variations will be apparent to those of skill in the art having the benefit of the disclosure herein.

Figure 3:
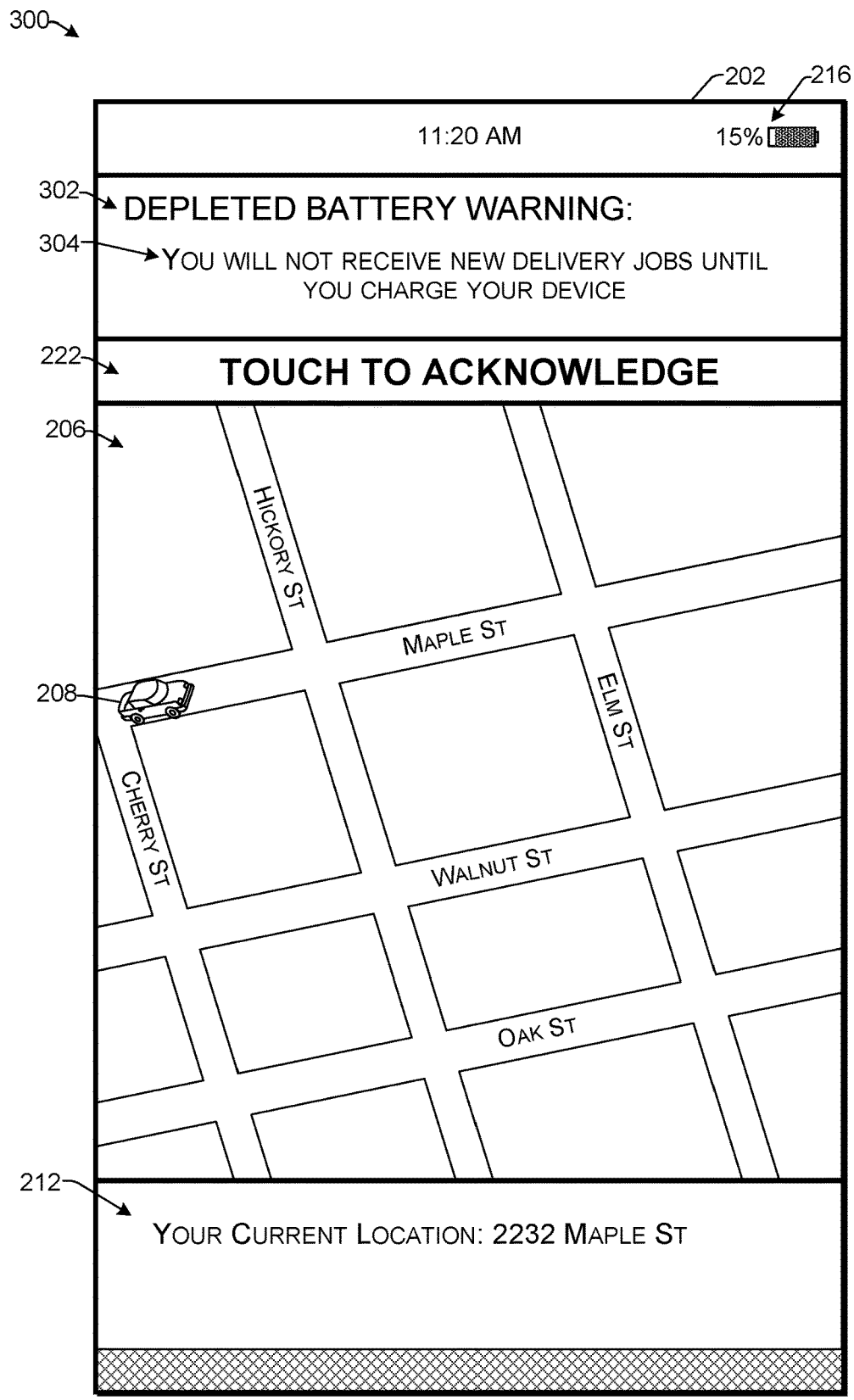
FIG. 3 illustrates an example courier interface enabling a courier to receive communications from the service computing device according to some implementations.

FIG. 3 illustrates an example GUI 300 that may be presented on the display 202 associated with the courier device 114 according to some implementations. The GUI 300 may be presented on the display 202 in the situation in which the battery power level continues to deplete and reaches a second threshold. As one example, when the second threshold is reached, the courier application may send an indication of the remaining power level of the courier device battery to the courier management program. In response, the courier management program may not assign any additional delivery jobs to the associated courier, such as until the battery power level of the courier device is detected as being above the second threshold. In addition, the service computing device may send an instruction to cause the courier application to present a depleted battery warning 302 on the display 202 of the courier device 114 and to provide a message 304 indicating that the courier needs to charge the battery before receiving additional delivery job assignments. Alternatively, the courier application itself may be configured to present the warning 302 and the message 304 automatically upon detecting that the battery power level has fallen below the second threshold.

Additionally, in some examples, the courier application may detect the charging state of the courier device 114. For example, if the battery power level is below the second threshold but is above a third threshold, and the battery is detected to be currently charging, e.g., in the car of the courier or the like, then the courier application may send this information to the courier management program. In response, based on the battery power level being above the third threshold and the charging state of the battery of the courier device being detected as currently charging, the courier management program may resume assigning delivery jobs to the courier.

As another example, when the battery power level is detected as being below the first or second threshold, rather than cutting off the particular courier entirely, the service provider may consider an amount of time that a delivery job is predicted to require to be completed when determining whether to assign the particular delivery job to the particular courier associated with a courier device that is below the first or second threshold. For example, if the delivery job is predicted to take 40 minutes, the courier management program may select a different courier to perform the delivery job, whereas if the delivery job is predicted to take 10 minutes, the courier management program may assign the job to the courier with the low battery. For instance, the courier management program may estimate the remaining time for the particular courier mobile device before the battery is fully depleted and may only assign jobs to the particular courier if the delivery job can be completed within the predicted time, within a level of confidence, before the battery of the courier device is fully depleted.

Figure 4:
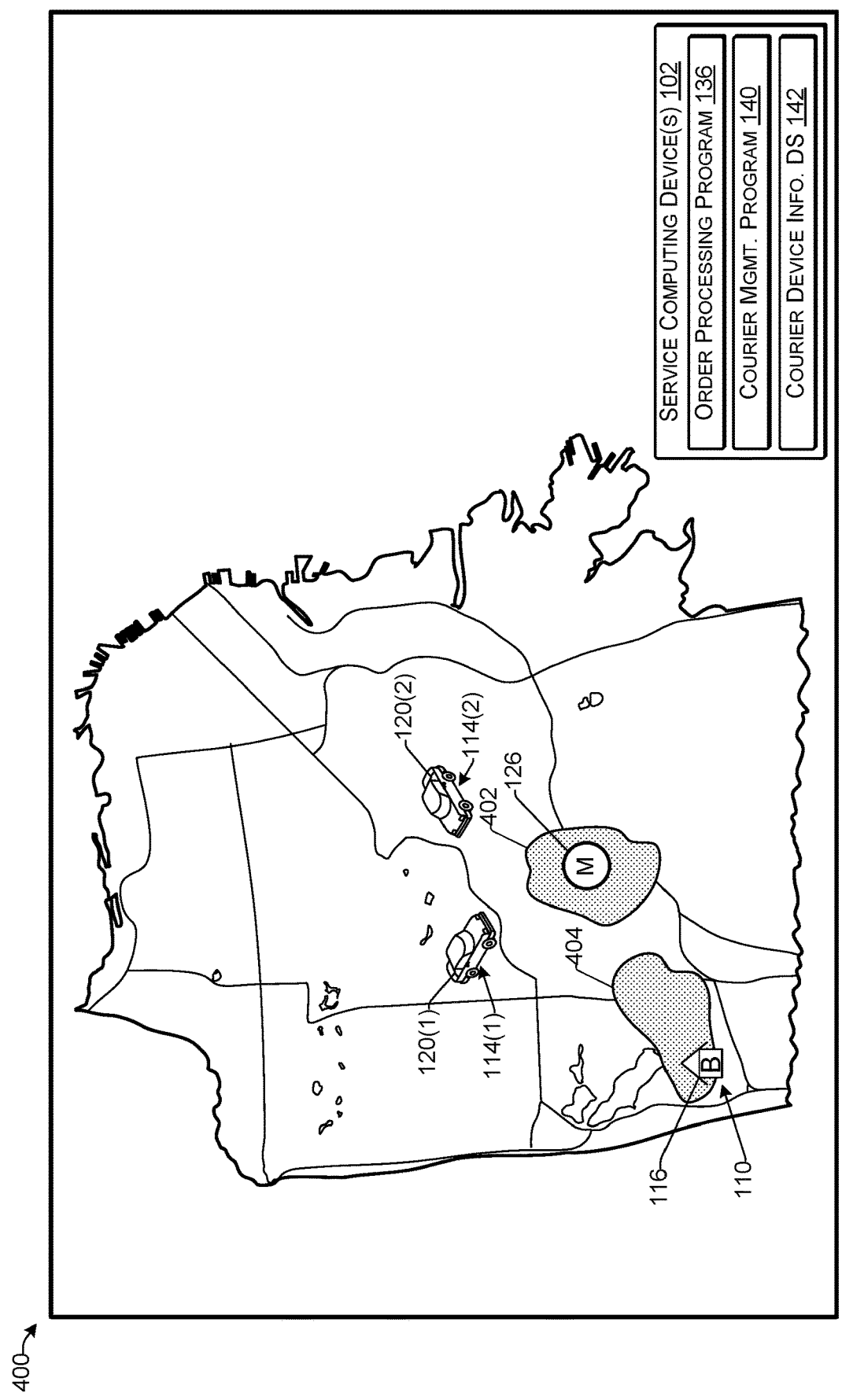
FIG. 4 illustrates an example of determining cellular dead zones that may affect communication availability for a courier device according to some implementations.

FIG. 4 illustrates an example of determining dead zones that may affect communication availability for a courier device according to some implementations. As mentioned above, when determining expected communication availability of a courier device 114 for performing a delivery job, the courier management program 140 may take into consideration the cellular signal strength and the existence of any dead zones for each courier's cellular carrier when assigning a particular delivery job to a particular courier. For instance, if the merchant pickup location 126 or the buyer delivery location 116 for a particular order is located in a known dead zone 402 or 404, respectively, for a particular cellular carrier used by a first courier device 114(1) of a first courier 120(1), but a different cellular carrier used by a second courier device 114(2) of a second courier 120(2) has better service in the area, the courier management program 140 may assign the delivery job to the second courier 120(2), rather than to the first courier 120(1). Accordingly, the courier management program 140 may be configured to select a courier device that is expected to be available to communicate with the service computing device 102 over the entire route of the delivery job, i.e., from the time and location that the courier accepts the delivery job until the time and location at which the delivery is completed.

In the example, of FIG. 4, suppose that the order processing program 136 receives an order from a buyer 110 for an item to be picked up from a merchant pickup location 126. The order processing program 136 sends order information to the courier management program 140 to assign a courier to pick up the item and deliver the item to the delivery location 116. Furthermore, suppose that the first courier 120(1) having the first courier device 114(1) and the second courier 120(2) having the second courier device 114(2) are currently available within a threshold distance of the merchant pickup location 126.

The courier management program 140 may determine the predicted communication availability of each of the courier devices 114(1) and 114(2) when selecting a courier to perform the delivery job. For example, the courier management program 140 may determine that both courier devices 114(1) and 114(2) have a battery power level that is above the respective second threshold for each courier device 114(1) and 114(2). Further, the courier management program 140 may check whether the merchant pickup location 126 or the buyer delivery location 116 is located in a dead zone, i.e., a geographic region in which the courier device 114 may lose cellular service. When performing the check for dead zones, the courier management program 140 may access the courier device information data structure 142, which may include signal strength information received from the first and second courier devices 114(1) and 114(2), respectively, in the past during previous delivery jobs. In addition, in some cases, the courier management program 140 may access signal strength information received from a plurality of other courier devices 114 (not shown in FIG. 4) during a large number of previous delivery jobs. Particularly, the courier management program 140 may access the signal strength information received from those courier devices 114 that use the same cellular carrier as either the first courier device 114(1) or the second courier device 114(2). In addition, in some examples, the courier management program 140 may access one or more coverage maps for the region that may be provided by the cellular carriers themselves or by third parties.

In this example, suppose that the courier management program 140 identifies a first dead zone 402 and a second dead zone 404 for a first cellular carrier used by the first courier device 114(1), and that the courier management program 140 has determined that at least one of the pickup location 126 and the buyer delivery location 116 is located within a dead zone in which the first cellular carrier is likely to lose cellular service for at least a portion of the time during the delivery job. Furthermore, suppose that the courier management program 140 determines that there are no known dead zones for a second cellular carrier used by the second courier device 114(2). In this case, the courier management program 140 may select the second courier 120(2) to perform the delivery job based on determining that the communication availability up the second courier device 114(2) is more likely to be maintained during the entire duration of the delivery job.

Additionally, or alternatively, such as in the case that the merchant pickup location 126 is located in a dead zone 402 for multiple cellular carriers, the merchant application on the merchant device (not shown in FIG. 4) may include courier detection module that may configure the merchant device to detect the arrival of a selected courier 120 at the pickup location 126 such as through a direct Bluetooth or Wi-Fi communication with the courier application on the courier device 114. Based on detecting the arrival of the courier device 114 at the pickup location 126, the merchant application may send a communication to the courier management program 140 over a local wired or wireless network connected to the Internet, such as the merchant's Wi-Fi network, or the like, to inform the courier management program 140 that the courier 120 selected to perform the delivery job has arrived at the merchant pickup location 126. Similarly, when the courier 120 departs from the merchant pickup location 126 with the item for delivery, the merchant application may send another communication to the courier management program 140 to inform the courier management program 140 that the item is out for delivery to the buyer delivery location 116.

Further, in some cases, the merchant device may be configured by the merchant application to perform the above-discussed courier detection and reporting functions regardless of whether the merchant pickup location 126 is located in a cellular dead zone. For example, the merchant device may be configured to perform these functions as a redundant measure for ensuring that the courier management program 140 remains appraised of the courier location and progress during the delivery job.

Additionally, in the case that the buyer delivery location 116 is in a cellular dead zone 404, the buyer application on the buyer device may be configured to use the buyer's local Internet connection to send a message to the courier management program 140 when the courier device 114 is detected as arriving at the delivery location 116, and/or may send another message to the courier management program 140 when the courier device is detected to have departed from the delivery location 116. Further, in some cases, the buyer application may configure the buyer device to perform the above-discussed courier detection and reporting functions regardless of whether the buyer delivery location 116 is located in a cellular dead zone, e.g., as a redundant measure. For instance, the buyer may be provided an opportunity to opt in to allowing the buyer application to send the messages when installing the buyer application on the buyer device.

Additionally, in some implementations, the courier management program 140 may take into consideration the reliability of each courier's mobile device 114(1) and 114(2) when selecting a courier to assign to a particular delivery job. For example, if the first courier's mobile device 114(1) crashes or otherwise fails often, the service computing device may select the second courier 120(2) over the first courier 120(1) when determining which courier to offer a particular delivery job based at least in part on predicting that the availability of the second courier mobile device 114(2) will be greater than that of the first courier mobile device 114(1). Accordingly, when determining communication availability, the courier management program 140 may take into account a number of factors including current battery level of a courier device, likelihood of cellular dead zones, likelihood of courier application failure on the courier device, likelihood of courier device failure, and so forth. Further, in some cases, these factors may be weighted or otherwise prioritized, as discussed additionally below.

Figure 5:
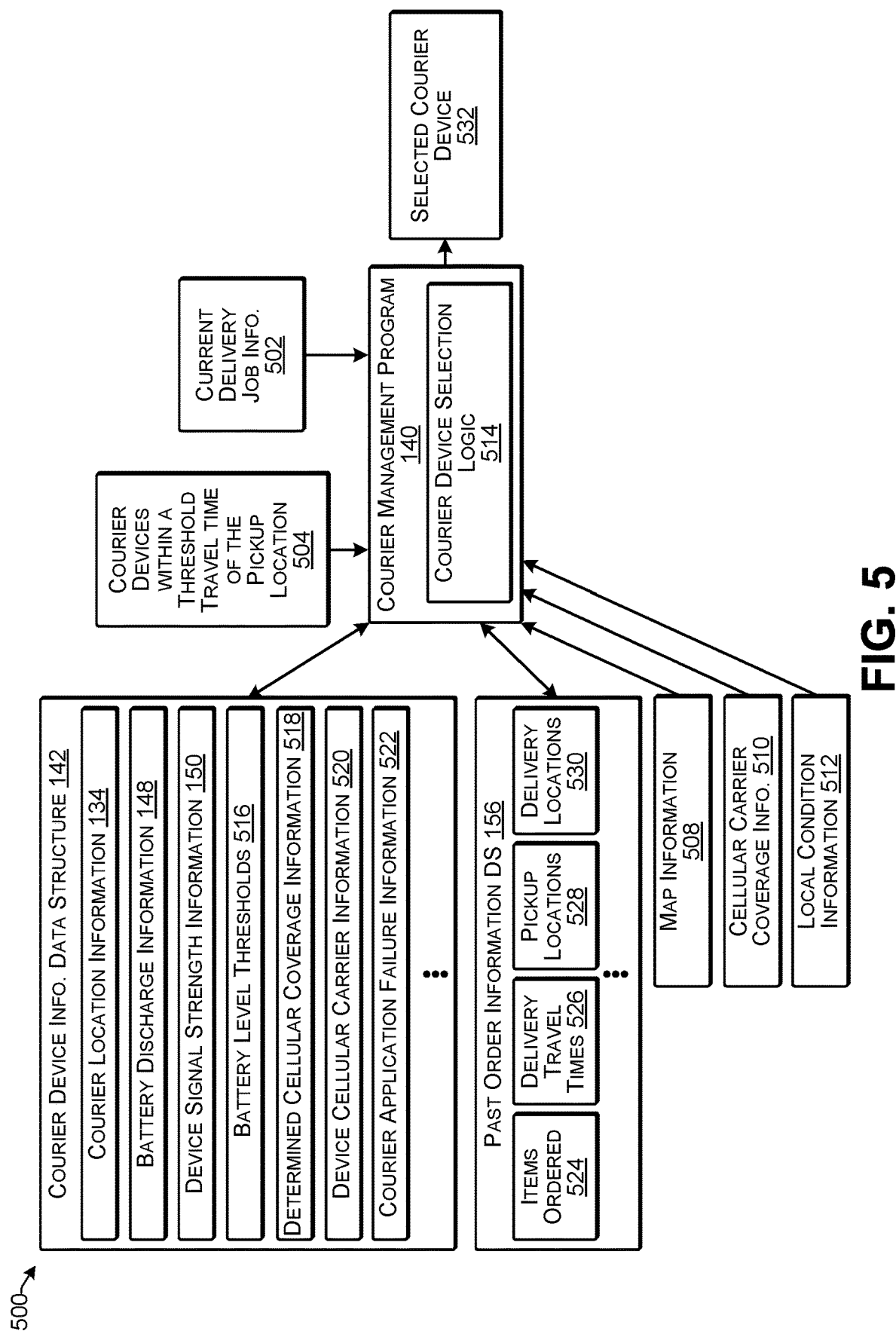
FIG. 5 illustrates an example framework for determining a courier device for a delivery job according to some implementations.

FIG. 5 is a block diagram illustrating an example framework 500 for selecting a courier device for a delivery job based on communications availability of the courier device according to some implementations. In this example, the courier management program 140 may receive current delivery job information 502, which may indicate, for example, a merchant pickup location and a buyer delivery location for the current delivery job. For instance, the courier management program 140 may receive the current delivery job information 502 from the order processing program, e.g., as discussed above with respect to FIG. 1. Based on the merchant pickup location for the delivery job, the courier management program 140 may access the courier device information data structure 142 to determine, from recently received courier location information 134, one or more couriers within a threshold travel time of the merchant pickup location. For example, the threshold travel time may be based in part on an amount of time it will take for the merchant to prepare the order so that the courier may arrive before or close to the time at which preparation of the order is completed to minimize any spoilage of the prepared item. In this example, as indicated at 504, the courier management program 140 may identify a plurality of courier devices within a threshold travel time of the merchant pickup location.

In addition, the courier management program 140 may receive map information 508, cellular carrier coverage information 510, and local condition information 512, such as from one or more web servers, databases, or the like (not shown in FIG. 5). The courier management program 140 may use the map information 508 when determining a route from the merchant pickup location to the buyer delivery location and further for determining an estimated travel time for each courier to arrive at the merchant pickup location. For example, when determining the estimated travel time to the merchant pickup location, and the route from the merchant pickup location to the buyer delivery location, the courier management program 140 may use the map information 508 as well as local condition information 512, which may include traffic information, weather conditions, construction, road closures, events that may interfere with traffic, and the like. The cellular carrier coverage information 510 may be received from the individual cellular carriers.

In the examples herein, the courier management program 140 includes courier device selection logic 514 that may determine a predicted communication availability of the courier devices 504 within the threshold travel time for selectin a particular one of the courier devices to perform the current delivery job. For example, the courier device selection logic 514 may access the courier device information data structure 142 and the past order information data structure 156 to use the information stored therein for determining the communication availability of each of the courier devices 504 within the threshold travel time of the merchant pickup location.

For instance, the courier device information data structure 142 may include stored information received from a distributed network of a plurality of courier devices for both past and present orders. Examples of the stored information may include courier location information 134, battery discharge information 148, device signal strength information 150, battery level thresholds 516, cellular coverage information 518 (e.g., determined based on signal strength, which may include any determined cellular dead zones), device cellular carrier information 520, courier application failure information 522, and so forth.

For example, the courier management program 140 may analyze the received battery discharge information 148 to determine battery level thresholds 516 for individual courier devices of a plurality of courier devices in the distributed network of courier devices in the system herein, such as discussed above with respect to FIG. 1. In some cases, the courier management program 140 may provide the battery level thresholds to the individual courier devices to which they apply for use by the respective courier applications on the respective courier devices for detecting when a first or second battery threshold is reached. In other cases, the battery level thresholds 516 may be retained at the service computing device 102, and the courier management program 140 may compare the received battery discharge information 148 for each courier device with the first and second battery level thresholds that apply to each courier device for determining whether the first or second battery level threshold for a particular courier device has been reached. Accordingly, the monitoring of the individual battery levels for each individual courier device may be performed on the individual courier device itself and/or may be performed by the courier management program 140 on the service computing device.

As another example, the courier management program 140 may determine, from the device signal strength information 150 and the map information 508, determined cellular coverage information 518, which may include an identification of any cellular dead zones in which certain ones of the courier devices were detected as having no cellular service at certain geographic locations.

As one example, the courier management program 140 may cross-reference the courier location information 134 with the device signal strength information 150 based on corresponding timestamps associated with each to determine the location of an individual courier device when the signal strength showed no cellular service to be available for that courier device. When a dead zone is located for a particular courier device, the cellular carrier used by the particular courier device may be determined from the device cellular carrier information 520. For example, the device cellular carrier information 520 may be determined for each courier device, such as from SIM card (subscriber identity module card) information, or the like, and stored in the courier device information data structure 142. Accordingly, the courier management program 140 may use the received courier location information 134 and received device signal strength information 150 to compile cellular coverage information 518 based on the signal strengths for each different cellular carrier used by the courier devices, and to thereby identify any dead zones determined for particular cellular carriers.

Furthermore, the courier management program 140 may receive courier application failure information 522, which may be reported by the courier application each time the courier application crashes and has to be restarted, reinstalled, or the like. The courier application failure information 522 may further include reports of failures of the courier device, which may indicate reliability issues with the courier device and/or the operation of the courier application on the courier device. As one example, if the courier application is detected as failing more than a threshold number of times per day, the particular courier device may be determined to be unreliable, and may be less likely to be selected for a current delivery job 502 based on a likelihood of the courier device failing during the delivery job. For instance, based on the courier application failure information 522 received over time, the courier management program 140 may determine a likelihood that the courier device will fail during a particular delivery job.

In addition, the courier management program 140 may access the past order information data structure 156, which may include information about a plurality past orders that have been completed by the plurality of couriers. Examples of information included in the past order information data structure 156 include items ordered 524, delivery travel times 526, pickup locations 528, and delivery locations 530, as well as other information, as discussed above. For example, the delivery travel times 526, pickup locations 528, and delivery locations 530 may be used for estimating the delivery travel time for a current delivery job, e.g., from the pickup location to the delivery location, as well as estimated courier travel times.

As one example, the courier delivery travel times 526, may indicate the time that an order was assigned and the time that the order was delivered, e.g., how long it took each courier to arrive at the delivery location and handoff the item after being assigned an order. Additionally, courier location information 134 may include locations of individual couriers at different times of day, for different days of the week, and in different parts of a service region. For instance, the courier location information 134 and/or delivery travel times 526 may be used to determine how long it took each courier to travel known distances, such as from the location at which the order was assigned to the pickup location and subsequently from the pickup location to the delivery location.

In some examples, the courier management program 140 may employ the courier selection logic 514 for selecting a courier device 532 that is likely to be available for communication with the service computing device throughout the delivery job, e.g., from when the courier accepts the delivery job until the courier completes the delivery job. The courier selection logic 540 may include one or more algorithms, one or more computational models, a plurality of decision-making rules, or the like, configured to select a particular courier device for a current delivery job based at least partially on determining the likelihood of communications with the courier device remaining available for the entire duration of the delivery job.

When selecting a courier device for a particular delivery job, the courier device selection logic 514 may initially access the recently received courier location information 134 for determining the courier devices 504 within the threshold travel time of the pickup location. As mentioned above, each courier application on each courier device may automatically send courier location information 134, battery discharge information 148, device signal strength information 150, and/or courier application failure information 522 to the courier management program 140 on a periodic basis while as the associated courier is on-duty or otherwise active. Thus, the courier management program 140 may continually receive courier location information 134 from each active courier device, such as every 10 seconds, every 30 seconds, every minute, every 2 minutes etc., and may continually update the courier location with respect to the map information 508.

Additionally, the courier device selection logic may determine whether any of the courier devices 504 have a battery level that has been determined to be below the second threshold for the respective courier device. In some cases, if the battery level for a particular courier device is below the second threshold for that courier device, the particular courier device may be removed from consideration for execution of the current delivery job. In other examples, as discussed above, the courier device selection logic 514 may take into consideration an expected overall time for completion of the job, a remaining battery level of the particular courier device, and a historic battery discharge rate for the particular courier device when determining whether to include the particular courier device in consideration for assigning the current delivery job.

Furthermore, the courier device selection logic may determine whether there are any identified cellular dead zones associated with the current delivery job, such as at the merchant pickup location, at the buyer delivery location, between the pickup location and the delivery location, or the like. For instance, the courier device selection logic 514 may determine the device cellular carrier for each of the courier devices 504 from the device cellular carrier information 520, and may access the determined cellular coverage information 518 for each of these cellular carriers to determine whether any dead zones have been identified for any of the cellular carriers. In some cases, if a dead zone is identified as being associated with the current delivery job, for a particular one of the courier devices 504, that courier device may be removed from consideration for assigning the current delivery job. In other cases, such as if no other courier devices are available for the current delivery job, and the dead zone is at the location of the merchant pickup location, the merchant application of the merchant may be requested to provide a report when the courier is detected as arriving at the merchant location and/or when the courier is detected as departing from the merchant location, as described above. A similar technique may be used if the dead zone is at the buyer delivery location, as discussed above.

In addition, the courier device selection logic 514 may take into consideration the courier application failure information 522 when determining whether to assign the current delivery job to a particular one of the courier devices 504. For example, if the courier application information 522 indicates that one of the courier devices 504 is failing frequently such that there is a high likelihood that the courier application on the courier device will fail during the current delivery job, the courier device selection logic may select a different one of the courier devices for the current delivery job. Furthermore, while several examples are discussed above for selecting a courier device for a delivery job based on expected communication availability, numerous other variations will be apparent to those of skill in the art having the benefit of the disclosure herein.

Figure 6:
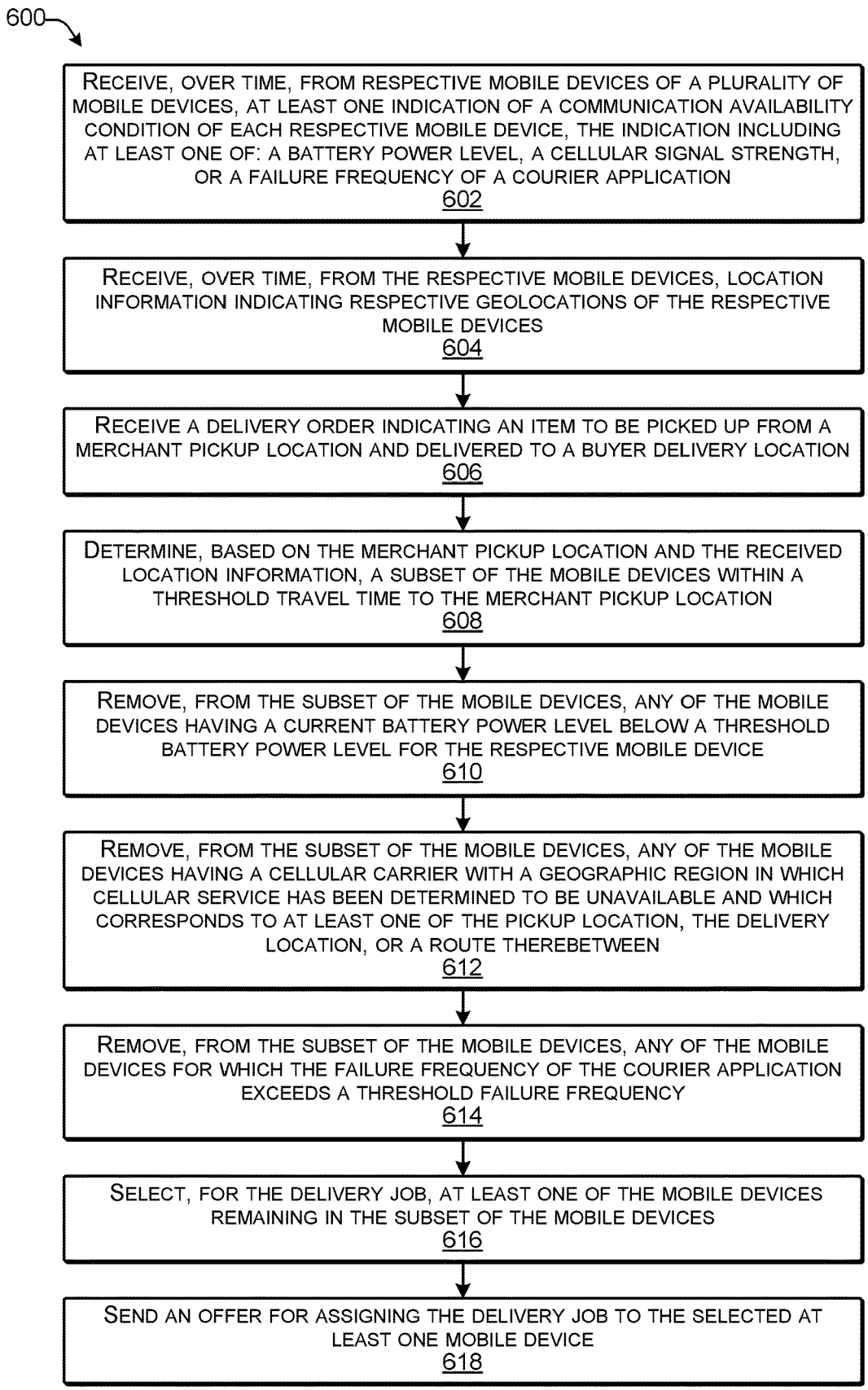
FIG. 6 is a flow diagram illustrating an example process for selecting a courier device based on predicted communication availability according to some implementations.
Figure 7:
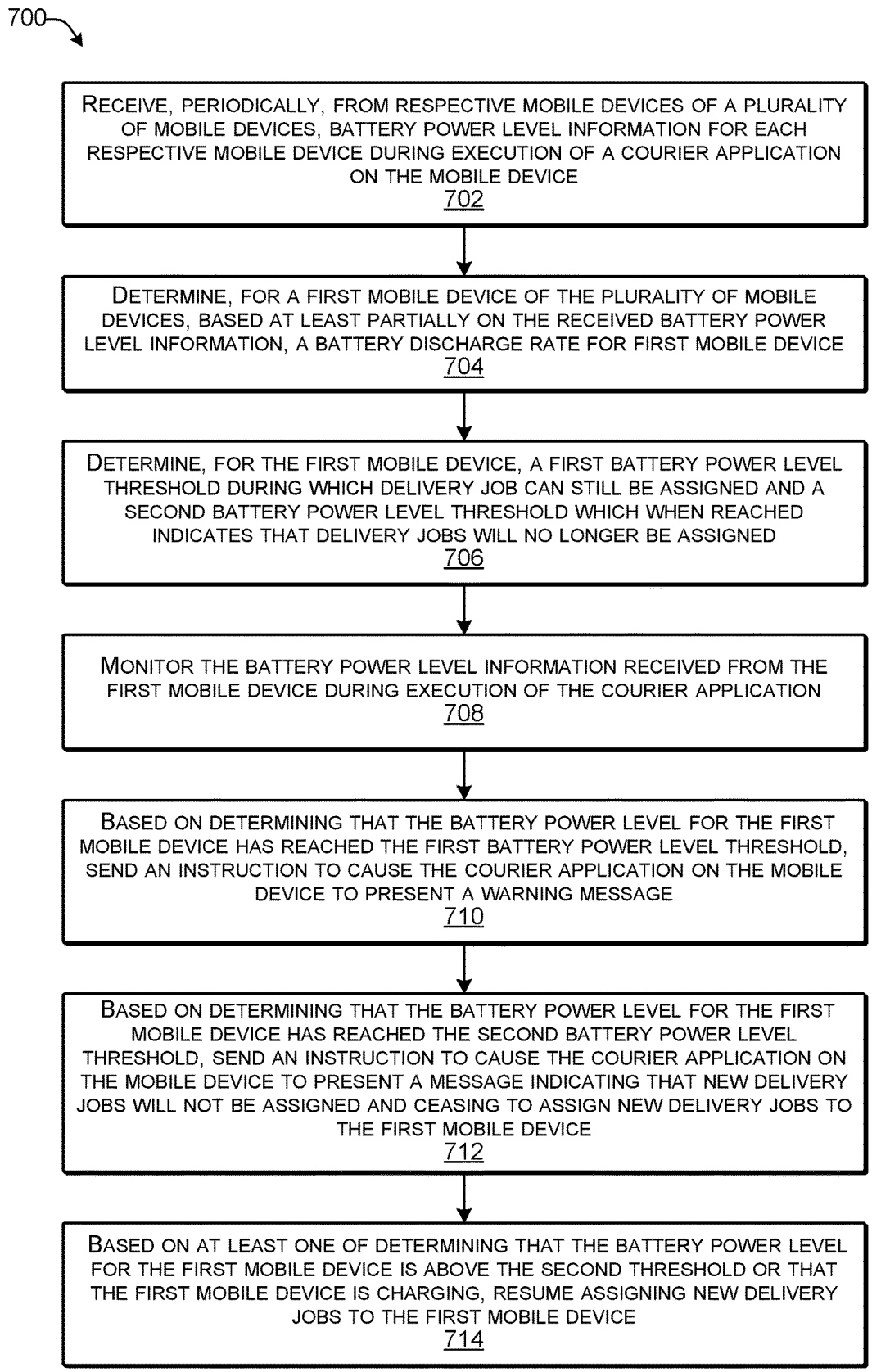
FIG. 7 is a flow diagram illustrating an example process for managing a distributed system of mobile devices based on battery information according to some implementations.

FIGS. 6 and 7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 6 is a flow diagram illustrating an example process 600 for determining communication availability of a courier device according to some implementations. In some examples, the process may be executed in part by the service computing device 102 or by another suitable computing device, such as by execution of the courier management program 140.

At 602, the computing device may receive over time, from respective mobile devices of a plurality of mobile devices, at least one indication of a communication availability condition of each respective mobile device. For example, the indication may include at least one of: a battery power level of the respective mobile device, a cellular signal strength of the respective mobile device, or an indication of a failure frequency of a courier application executing on the respective device. The failure frequency of the courier application may include failure caused by the courier application, as well as other failures not caused by the by the courier application but that may cause the device to not function properly and thereby interfere with proper operation of the courier application. For example, each mobile device may be associated with a respective courier and may execute an instance of a courier application, which configures the mobile device as a courier device for performing the functions described herein. The system herein includes a distributed network of a plurality of courier devices associated with a plurality of couriers, respectively, and the courier devices may be configured by the courier application to send respective electronic communications including some or all of the above-listed information determined by respective instances of the courier application executing on the courier devices.

At 604, the computing device may receive, over time, from the respective mobile devices, location information indicating respective geolocations of the respective mobile devices. For instance, the computing device may receive respective geographic locations based on GPS information or other sensed location information determined by each mobile device.

At 606, the computing device may receive a delivery order indicating an item to be picked up from a merchant pickup location and delivered to a buyer delivery location. For example, the computing device may receive, from a buyer device, an order including an identification of an item to be obtained from a specified merchant and an indication of a delivery location for delivery of the item.

At 608, the computing device may determine, based on the merchant pickup location and the received location information, a subset of the mobile devices within a threshold travel time to the merchant pickup location. For example, based at least in part on the received geographic locations of the courier devices, one or more couriers within a threshold travel time to the pickup location of the merchant may be identified based at least in part on the item identified in the order. As one example, the predicted courier travel times may be determined based on the distances between the current locations of the courier devices and the indicated pickup location. The threshold travel time may be based in part on a preparation time necessary for the merchant to prepare the item, but may also take into consideration a spoilage time of the item. For example, an item with a longer preparation time and/or longer spoilage time may enable a longer threshold travel time for the couriers.

At 610, the computing device may remove, from the subset of the mobile devices, any of the mobile devices having a current battery power level below a threshold battery power level for the respective mobile device. Thus, the computing device might only consider assigning the delivery job to courier devices within the threshold distance that do not have battery levels below the respective second thresholds previously determined for the respective courier devices. As discussed above, the first and second thresholds for battery power levels may be different for different ones of the respective mobile devices, such as based on battery discharge information received over time from the respective mobile devices.

At 612, the computing device may remove, from the subset of the mobile devices, any of the mobile devices having a cellular carrier with a geographic region in which cellular service has been determined to be unavailable and which corresponds to at least one of the pickup location, the delivery location, or a route there between. For example, the computing device may determine whether any of the cellular carriers used by the mobile devices in the subset have dead zones in which cellular service is unavailable in a geographic region within which is located at least one of the pickup location, the delivery location, or the route between the pickup location or the delivery location. Further, in some cases, the dead zone consideration may also consider a route between the courier's current location and the pickup location.

At 614, the computing device may remove, from the subset of the mobile devices, any of the mobile devices for which the failure frequency of the courier application exceeds a threshold failure frequency. For example, if the failure frequency exceeds a threshold frequency, e.g., the device and/or the courier application crashes every hour, every half hour, etc., the computing device may determine to not assign a delivery job to the particular mobile device if other mobile devices are available to perform the delivery job that do not fail as frequently.

At 616, the computing device may select, for the delivery job, at least one of the mobile devices remaining in the subset of the mobile devices. For example, the computing device may select any or all of the mobile devices remaining in the subset. In some cases, the computing device may select a mobile device of a courier who has not received a delivery job for the longest amount of time. In other cases, the computing device may offer the delivery job to all of the remaining couriers, and may assign the job to the courier who accepts the job soonest. Numerous other variations will be apparent to those of skill in the art having the benefit of the disclosure herein.

At 618, the computing device may send an offer for assigning the delivery job to the selected at least one mobile device. Upon receiving an acceptance of the delivery job, the computing device may send to the accepting mobile device information regarding at least the pickup location.

FIG. 7 is a flow diagram illustrating an example process 700 for managing a distributed system of mobile devices based on detected battery levels of the mobile devices according to some implementations. In some examples, the process may be executed at least partially by the service computing device 102 executing the courier management program 140, or the like.

At 702, the computing device may receive, periodically, from respective mobile devices of a plurality of mobile devices, battery power level information for each respective mobile device during execution of a courier application on the mobile device.

At 704, the computing device may determine, for a first mobile device of the plurality of mobile devices, based at least partially on the received battery power level information, a battery discharge rate for first mobile device. As discussed above, the battery discharge rate over time may be measured for each mobile device of the plurality of mobile devices.

At 706, the computing device may determine, for the first mobile device, a first battery power level threshold during which delivery job can still be assigned and a second battery power level threshold which when reached indicates that delivery jobs will no longer be assigned. For example, the second battery power level threshold may be selected so that if a delivery job is assigned while the battery power level is above the second threshold, sufficient battery life remains to enable the job to be completed (e.g., within a $90^{th}$ percentile of all delivery jobs) before the battery is completely depleted. For example, if 90 percent of all delivery jobs a completed within 40 minutes from the time that the courier accepts the job until the time that the delivery is complete, then the second threshold may be set so that 40 minutes may elapse before battery is fully depleted. Further, as mentioned above, in some examples, each courier device may have custom first and second thresholds, while in other examples, the first and/or second thresholds may be determined based on mobile device brand, model, or the like. Further, in still other examples, the first and/or second threshold may be default thresholds used for all mobile devices in the system.

At 708, the computing device may monitor the battery power level information received from the first mobile device during execution of the courier application.

At 710, based on determining that the battery power level for the first mobile device has reached the first battery power level threshold, the computing device may send an instruction to cause the courier application on the mobile device to present a warning message At 712, based on determining that the battery power level for the first mobile device has reached the second battery power level threshold, the computing device may send an instruction to cause the courier application on the mobile device to present a message indicating that new delivery jobs will not be assigned and the computing device may cease to assign new delivery jobs to the first mobile device.

At 714, based on at least one of determining that the battery power level for the first mobile device is above the second threshold or that the first mobile device is charging, the computing device may resume assigning new delivery jobs to the first mobile device.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
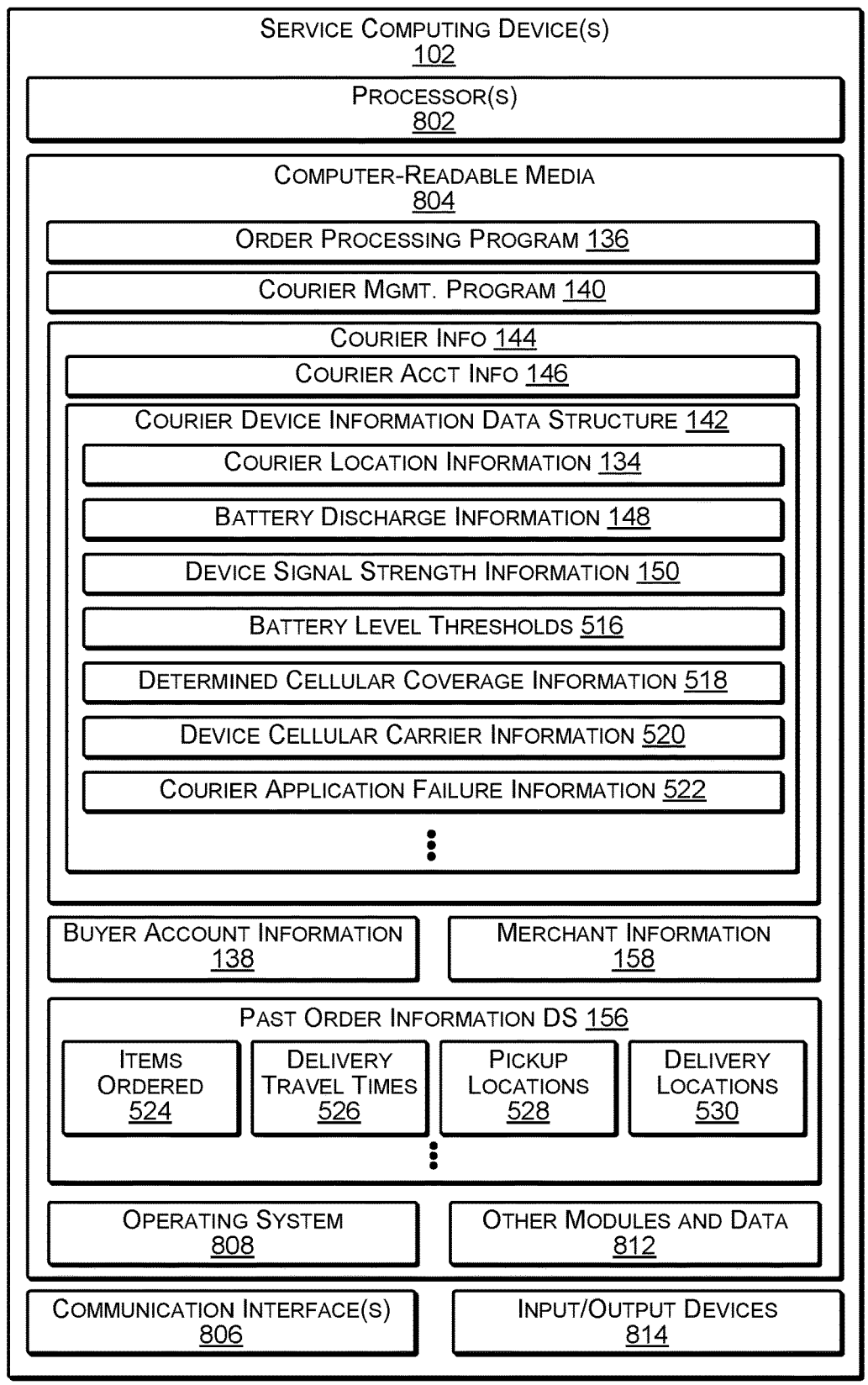
FIG. 8 illustrates select components of one or more example service computing devices according to some implementations.

FIG. 8 illustrates select components of the service computing device 102 that may be used to implement some functionality of the services described herein. The service computing device 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the order processing program 136 and the courier management program 140. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store: the courier information 144, including courier account information 146 and the courier device information data structure 142. The courier device information data structure may include courier location information 134, battery discharge information 148, device signal strength information 150, battery level thresholds 516, determined cellular coverage information 518, device cellular carrier information 520, and courier application failure information 522. Additional data may include the buyer account information 138, the merchant information 158, and the past order information 156, including the items ordered 524, the delivery travel times 526, pickup locations 528 and delivery locations 530. The service computing device 102 may also include or maintain other functional components and data not specifically shown in FIG. 8, such as other modules and data 812, which may include programs, drivers, etc., and the data used or generated by the functional components. Further, the service computing device 102 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 814. Such I/O devices 814 may include a display, various user interface controls (e.g., buttons, joystick, keyboard, mouse, touch screen, etc.), audio speakers, connection ports and so forth.

Figure 9:
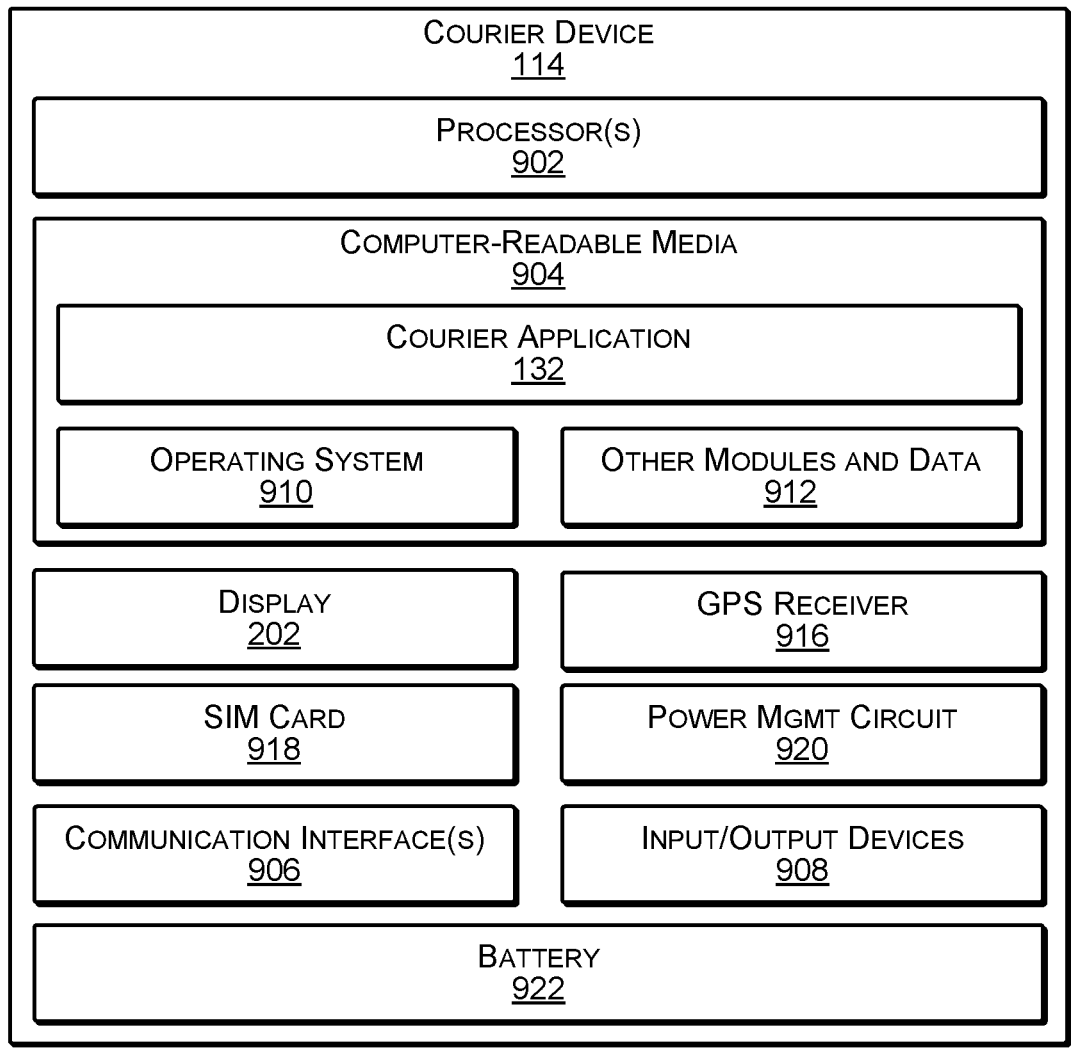
FIG. 9 illustrates select components of an example courier device according to some implementations.

FIG. 9 illustrates select example components of the courier device 114 that may implement the functionality described above according to some examples. The courier device 114 may be any of a number of different types of portable or otherwise mobile computing devices. Some examples of the courier device 114 may include smart phones and mobile communication devices; tablet computing devices; laptops, netbooks and other mobile computers; wearable computing devices and/or body-mounted computing devices, which may include watches; augmented reality devices, such as helmets, goggles or glasses; and any other mobile device capable of sending communications and performing the functions according to the techniques described herein.

In the example of FIG. 9, the courier device 114 includes components such as at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the courier device 114, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the courier device 114 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, programs, or components that may be executed by the processor 902. Further, when mentioned herein, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the courier device 114. Functional components of the courier device 114 stored in the computer-readable media 904 may include the courier application 132, as discussed above, which may present the courier with one or more GUIs for performing the courier tasks as described herein. Additional functional components may include an operating system 910 for controlling and managing various functions of the courier device 114 and for enabling basic user interactions with the courier device 114.

In addition, the computer-readable media 904 may also store data, data structures and the like, that are used by the functional components. Depending on the type of the courier device 114, the computer-readable media 904 may also optionally include other functional components and data, such as other modules and data 912, which may include applications, programs, drivers, etc., and the data used or generated by the functional components. Further, the courier device 114 may include many other logical, programmatic, and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 9 further illustrates that the courier device 114 may include the display 202, which may be any suitable type of electronic display device for visually presenting information, GUIs, or the like. Alternatively, in some examples, the courier device 114 may not include a display.

The courier device 114 may further include the one or more I/O devices 908. The I/O devices 908 may include speakers, a microphone, a camera, and various user controls (e.g., buttons, a joystick, a keyboard, a keypad, etc.), a haptic output device, and so forth. Other components included in the courier device 114 may include various types of sensors, which may include a GPS receiver 916 able to receive and indicate location information, as well as other sensors (not shown) such as an accelerometer, gyroscope, compass, proximity sensor, and the like. In some cases, the GPS receiver 916 may be used by the courier application 132 to determine a current geographic location of the courier device 114. Additionally, or alternatively, the communication interfaces 906 may be used to determine the current location of the courier device 114, such as based on communication with nearby cell towers, wireless access points, and the like. In some examples, the courier application 132 may send this location information periodically to the service computing device as an indicated location of the associated courier. Additionally, or alternatively, the courier application 132 may send the location information whenever the accelerometer indicates a change in acceleration, e.g., beyond threshold amount, which may indicated starting movement or stopping movement by the courier.

In addition, the courier device includes a SIM card 918, which may identify a cellular carrier for the courier device. The courier device further includes a power management circuit, such as a PMIC, which may be accessed by the courier application, such as for determining a current state of a battery 922 of the courier device 114. Furthermore, the courier device 114 may include various other components that are not shown, examples of which include removable storage, and so forth.

Figure 10:
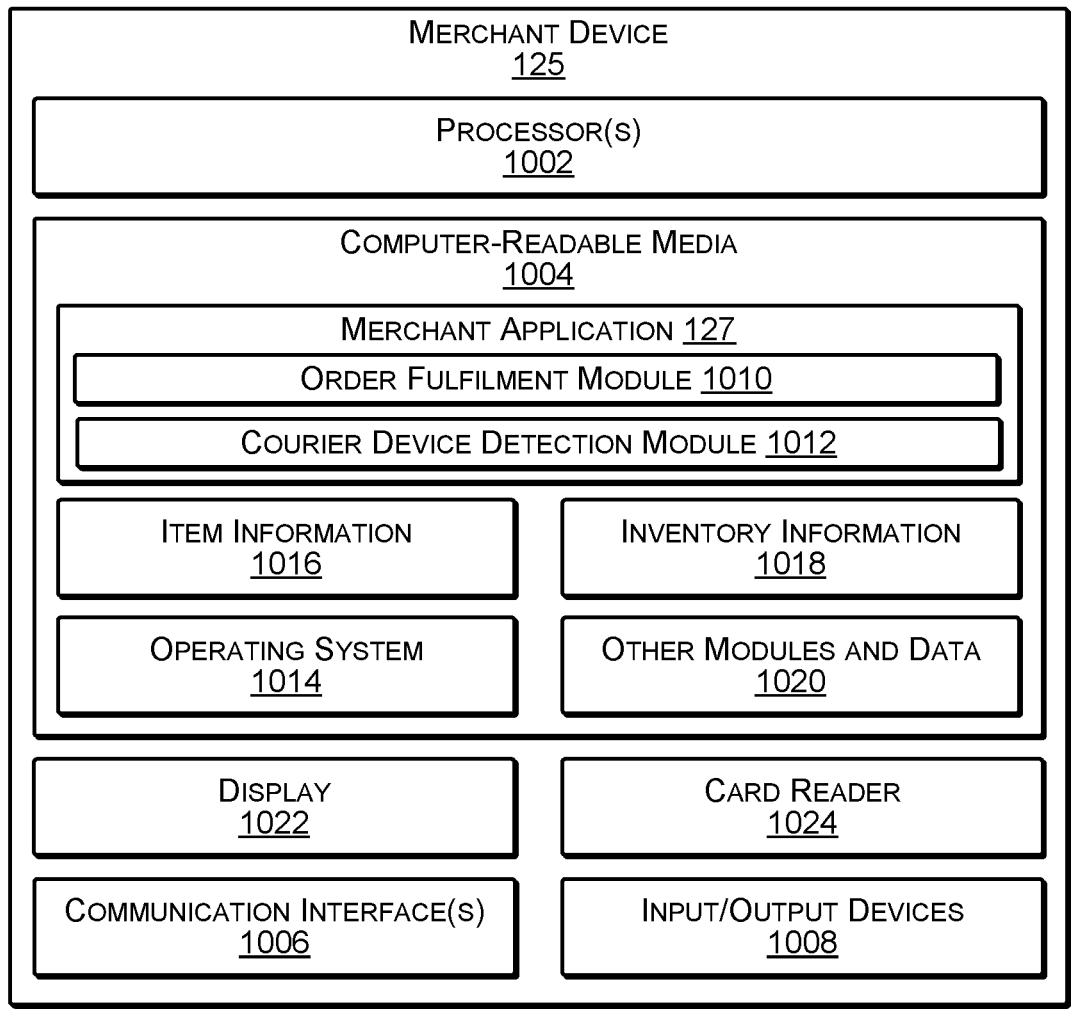
FIG. 10 illustrates select components of an example merchant device according to some implementations.

FIG. 10 illustrates select example components of an example merchant device 125 according to some implementations. The merchant device 125 may be any suitable type of computing device, e.g., portable, semi-portable, semi-stationary, or stationary. Some examples of the merchant device 125 may include tablet computing devices; smart phones and mobile communication devices; laptops, netbooks and other portable computers or semi-portable computers; desktop computing devices, terminal computing devices, and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 125 includes at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the merchant device 125, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, magnetic disk storage, optical storage, and/or other computer-readable media technology. Further, in some cases, the merchant device 125 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, programs, or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the merchant device 125. Functional components of the merchant device 125 stored in the computer-readable media 1004 may include the merchant application 130. In some examples, the merchant application 130 may include an order fulfillment module 1010 with transaction processing capability, such as for presenting an interface to enable the merchant to conduct transactions, receive payments, and so forth, as well as communicating with the service computing device 102 for processing payments, sending transaction information, receiving order information, sending merchant information, and so forth. Further, in some examples, the order fulfilment module 1010 may include merchant dashboard functionality, such as for presenting a GUI to enable the merchant to manage the merchant's account, the merchant profile, merchant preferences, view past orders, and the like. In addition, in the illustrated example, the merchant application 127 includes a courier device detection module 1012, as described above which may configure the merchant device 125 to detect a courier device when the courier device arrives at the merchant location, send a message to the service computing device, and so forth, as discussed above. Additional functional components may include an operating system 1014 for controlling and managing various functions of the merchant device 125 and for enabling basic user interactions with the merchant device 125.

In addition, the computer-readable media 1004 may also store data, data structures and the like, that are used by the functional components. For example, data stored by the computer-readable media 1004 may include item information 1016 that includes information about the items offered by the merchant, which may include images of the items, descriptions of the items, prices of the items, preparation times for the items, and so forth. In addition, inventory information 1018 may indicate how much of each item the merchant has in current inventory. Depending on the type of the merchant device 125, the computer-readable media 1004 may also optionally include other functional components and data, such as other modules and data 1020, which may include programs, drivers, etc., and the data used or generated by the functional components. Further, the merchant device 125 may include many other logical, programmatic, and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks, as well as short-range communications such as Bluetooth®, Bluetooth® low energy, and the like, as additionally enumerated elsewhere herein.

FIG. 10 further illustrates that the merchant device 125 may include a display 1022. Depending on the type of computing device used as the merchant device 125, the display 1022 may employ any suitable display technology, and may have a touch sensor in some examples. Alternatively, in some examples, the merchant device 125 may not include the display 1022, and information may be presented by other means, such as aurally.

The merchant device 125 may further include the one or more I/O devices 1008. The I/O devices 1008 may include speakers, a microphone, a camera, and various user controls (e.g., buttons, a joystick, a keyboard, a keypad, etc.), a haptic output device, and so forth.

In addition, the merchant device 125 may include or may be connectable to a card reader 1024. In some examples, the card reader 1024 may plug in to a port in the merchant device, such as a microphone/headphone port, a data port, or other suitable port. The card reader 1024 may include a read head for reading a magnetic strip of a payment card, and further may include encryption technology for encrypting the information read from the magnetic strip. Additionally, or alternatively, numerous other types of card readers may be employed with the merchant devices 104 herein, such as RFID chip card readers, depending on the type and configuration of the merchant device 125. Additionally, the merchant device 125 may include various other components that are not shown, examples of which include sensors, removable storage, a power source, such as a battery and power control unit, and so forth. Further, the buyer device 128 may have a configuration similar to that of the merchant device, but with different functional components and data.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing instructions which, when executed by the one or more processors, cause the one or more processors to perform operations comprising:
receiving, periodically over time, from respective mobile devices of a plurality of mobile devices, an indication of battery power level, each respective mobile device having a respective instance of an application executing thereon that configures the respective mobile device for communication with the one or more processors;

receiving, periodically over time, from the respective mobile devices, location information indicating a geolocation of each respective mobile device;

receiving, by the one or more processors, from a computing device, an indication of a first location and a second location;

determining, based on the location information received from the respective mobile devices, a subset of the mobile devices within a threshold travel time of the first location;

determining that a first mobile device in the subset of the mobile devices has a battery power level that is below a respective threshold battery power level selected to ensure communication with the first mobile device for a duration of travel from the first location to the second location;

removing the first mobile device from the subset of the mobile devices based on the first mobile device having the battery power level that is below the respective threshold battery power level for ensuring communication;

determining, based on application failure information received over time from individual ones of the mobile devices in response to failure of the application executing on the individual mobile devices, that a second mobile device in the subset of mobile devices experiences failure of the application executed on the second mobile device with a frequency that exceeds a threshold failure frequency;

removing, from the subset of the mobile devices, the second mobile device that experiences failure of the application during execution with the frequency that exceeds the threshold failure frequency;

selecting, for traveling from the first location to the second location, one of the mobile devices remaining in the subset of the mobile devices; and sending a communication to the selected mobile device to request travel from the first location to the second location.

2. The system as recited in claim 1, wherein the threshold battery power level for the at least one mobile device is different from a threshold battery power level for at least one other mobile device of the plurality of mobile devices.

3. The system as recited in claim 1, the operations further comprising:

prior to selecting the selected mobile device, determining that a third one of the mobile devices in the subset of mobile devices uses a first cellular carrier that has been determined to have cellular service that is unavailable in a geographic region corresponding to at least one of the first location, the second location, or a route between the first location and the second location;

determining that other mobile devices in the subset of mobile devices use a second cellular carrier that has been determined to have cellular service with greater availability in the geographic region; and removing, from the subset of the mobile devices, the third mobile device that uses the first cellular carrier.

4. The system as recited in claim 1, the operations further comprising:

prior to selecting the selected mobile device, determining, based on received mobile device failure information received over time from the individual mobile devices, that a third one of the mobile devices in the subset of mobile devices experiences mobile device failure with a frequency that exceeds a threshold device failure frequency; and removing, from the subset of the mobile devices, the third mobile device that experiences mobile device failure with the frequency that exceeds the threshold device failure frequency.

5. A method comprising:

receiving, by one or more processors of one or more service computing devices, from respective mobile devices of a plurality of mobile devices, an indication of a communication availability condition of each respective mobile device for travel between a first location and a second location, wherein receiving the indication of the communication availability condition includes receiving, by the one or more processors, via communication from respective instances of an application executing on respective ones of the mobile devices, an indication of a first cellular carrier used by a first mobile device and a second cellular carrier used by a second mobile device;

determining, by the one or more processors, that there is at least one geographic region associated with at least one of the first location, the second location, or a route between the first location and the second location, in which cellular service of the second cellular carrier used by the second mobile device is less available than cellular service of the first cellular carrier;

based at least on determining that there is the at least one geographic region, determining, by the one or more processors, that the first mobile device of the plurality of mobile devices is likely to have greater communication availability for a duration of the travel than the second mobile device of the plurality of mobile devices;

based at least partially on determining that the first mobile device is likely to have the greater communication availability for the duration of the travel, selecting, by the one or more processors, the first mobile device for the travel instead of the second mobile device; and sending, by the one or more processors, to the first mobile device, an instruction for traveling from the first location to the second location.

6. The method as recited in claim 5, wherein determining that the first mobile device is likely to have the greater communication availability for the duration of the travel than the second mobile device further comprises determining at least one of: that a battery power level of the first mobile device is above a respective battery power threshold for the first mobile device, or a battery power level of the second mobile device is below a respective battery power threshold for the second mobile device.

7. The method as recited in claim 6, further comprising determining the respective battery power threshold for the first mobile device based at least partially on battery discharge information received over time from the first mobile device, wherein the respective battery power threshold for the first mobile device is determined to be different from the respective battery power threshold for the second mobile device based at least on different discharge rates.

8. The method as recited in claim 5, further comprising:

receiving over time, as a portion of the indication of the communication availability condition of each respective mobile device of the plurality of mobile devices, battery discharge information for the respective mobile devices; and determining, for the respective mobile devices, based at least partially on the received battery discharge information, a first battery power level threshold at which to present a warning message on the respective mobile device, and a second battery power level threshold at which to cease assigning travel to the respective mobile device unless an indication is received from the respective mobile device that the respective mobile device is charging.

9. The method as recited in claim 5, wherein determining that the first mobile device is likely to have greater communication availability is based partially on received mobile device failure information indicating that the first mobile device fails less often than the second mobile device.

10. The method as recited in claim 5, wherein determining that there is at least one geographic region associated with at least one of the first location, the second location, or the route between the first location and the second location, in which the cellular service of the second cellular carrier used by the second mobile device is less available than the cellular service of the first cellular carrier further comprises:
receiving over time, as a portion of the indication of the communication availability condition of each respective mobile device of the plurality of mobile devices, cellular signal strength information for the respective mobile devices, the cellular signal strength having a signal strength time associated therewith;
receiving over time, location information for the respective mobile devices, the location information having a location time associated therewith;
determining, for the respective mobile devices, a cellular carrier for each of the mobile devices; and
determining for at least the second cellular carrier, based on correlating the signal strength times and the location times, at least one geographic region in which a correlated signal strength indicates cellular service is unavailable.

11. The method as recited in claim 5, further comprising:
receiving from the respective mobile devices an indication of a location of each respective mobile device of the plurality of mobile devices;
determining a pickup location associated with the travel;
determining a subset of the mobile devices within a threshold travel time of the of the pickup location; and
selecting the first mobile device from among the subset of the mobile devices.

12. The method as recited in claim 5, further comprising:
receiving over time, as a portion of the indication of the communication availability condition of each respective mobile device of the plurality of mobile devices, application failure information for the respective mobile devices; and
determining that the first mobile device is likely to have the greater communication availability for the duration of the travel than the second mobile device based partially on the received application failure information indicating that the application fails less often on the first mobile device than on the second mobile device.

13. The method as recited in claim 5, further comprising:
receiving, from a computing device associated with the first location for the travel, a first message indicating that the first mobile device has arrived at the first location based on detection of the first mobile device by the computing device; and
receiving, from the computing device, a second message indicating that the first mobile device has departed from the first location based on detection by the computing device that the first mobile device is no longer present at the first location.

14. One or more non-transitory computer-readable media storing instructions that, when executed by one or more processors of one or more service computing devices, program the one or more processors to:
receive, by the one or more processors, from respective mobile devices of a plurality of mobile devices, an indication of a communication availability condition of each respective mobile device, the indication including application failure information indicating a failure frequency of an application executing on the respective mobile device;
determine, by the one or more processors, based on the application failure information, that a first mobile device of the plurality of mobile devices is within a threshold failure frequency and that a second mobile device of the plurality of mobile devices experiences failure of the application executing on the second mobile device with a frequency that exceeds the threshold failure frequency;
based at least on determining that the second mobile device experiences application failure exceeding the threshold failure frequency, determine, by the one or more processors, that the first mobile device of the plurality of mobile devices is likely to have greater communication availability for a duration of the travel than the second mobile device of the plurality of mobile devices;
based at least partially on determining that the first mobile device is likely to have greater communication availability for the duration of the travel, select, by the one or more processors, the first mobile device for the travel instead of the second mobile device; and
send, by the one or more processors, to the first mobile device, a communication to assign the travel to the first mobile device.

15. The one or more non-transitory computer-readable media as recited in claim 14, wherein:
the received indication further includes a battery power level; and
the instructions further program the one or more processors to select the first mobile device for the travel based partially on determining at least one of: that a battery power level of the first mobile device is above a respective battery power threshold for the first mobile device, or a battery power level of the second mobile device is below a respective battery power threshold for the second mobile device.

16. The one or more non-transitory computer-readable media as recited in claim 14, wherein:
the received indication includes cellular carrier information for the respective mobile devices; and
the instructions further program the one or more processors to, based partially on determining that there is at least one geographic region associated with at least one of the first location or the second location, or a route between the first location and the second location, in which cellular service of a cellular carrier used by the second mobile device is unavailable, determine that the first mobile device is likely to have the greater communication availability for the duration of the travel than the second mobile device.

17. The one or more non-transitory computer-readable media as recited in claim 14, wherein:
the received indication includes mobile device failure information; and
the instructions further program the one or more processors to determine that the first mobile device is likely to have the greater communication availability for the duration of the travel than the second mobile device based partially on the received mobile device failure information indicating that the first mobile device fails less often than the second mobile device.

18. The one or more non-transitory computer-readable media as recited in claim 17, wherein the instructions further program the one or more processors to:
receive information for the travel including an indication of a first location at which travel begins;
determine a subset of the plurality of mobile devices that are within a threshold travel time of the first location; and
select the first mobile device from the subset of the plurality of mobile devices.

19. A system comprising:
one or more processors; and
one or more computer-readable media storing instructions which, when executed by the one or more processors, cause the one or more processors to perform operations comprising:
receiving, by the one or more processors, from respective mobile devices of a plurality of mobile devices, an indication of a communication availability condition of each respective mobile device for travel between a first location and a second location, wherein receiving the indication of the communication availability condition includes receiving, by the one or more processors, via communication from respective instances of an application executing on respective ones of the mobile devices, an indication of a first cellular carrier used by a first mobile device and a second cellular carrier used by a second mobile device;
determining, by the one or more processors, that there is at least one geographic region associated with at least one of the first location, the second location, or a route between the first location and the second location, in which cellular service of the second cellular carrier used by the second mobile device is less available than cellular service of the first cellular carrier;
based at least on determining that there is the at least one geographic region, determining, by the one or more processors, that the first mobile device of the plurality of mobile devices is likely to have greater communication availability for a duration of the travel than the second mobile device of the plurality of mobile devices;
based at least partially on determining that the first mobile device is likely to have greater communication availability for the duration of the travel, selecting, by the one or more processors, the first mobile device for the travel instead of the second mobile device; and
sending, by the one or more processors, to the first mobile device, a communication to assign travel from the first location to the second location to the first mobile device.

20. The system as recited in claim 19, wherein the operation of determining that the first mobile device is likely to have the greater communication availability for the duration of the travel than the second mobile device further comprises operations of determining at least one of: that a battery power level of the first mobile device is above a respective battery power threshold for the first mobile device, or a battery power level of the second mobile device is below a respective battery power threshold for the second mobile device.

21. The system as recited in claim 19, wherein the operation of determining that there is at least one geographic region associated with at least one of the first location, the second location, or the route between the first location and the second location, in which the cellular service of the second cellular carrier used by the second mobile device is less available than the cellular service of the first cellular carrier further comprises:
receiving over time, as a portion of the indication of the communication availability condition of each respective mobile device of the plurality of mobile devices, cellular signal strength information for the respective mobile devices, the cellular signal strength having a signal strength time associated therewith;
receiving over time, location information for the respective mobile devices, the location information having a location time associated therewith;
determining, for the respective mobile devices, a cellular carrier for each of the mobile devices; and
determining for at least the second cellular carrier, based on correlating the signal strength times and the location times, at least one geographic region in which a correlated signal strength indicates cellular service is unavailable.

22. The system as recited in claim 19, the operations further comprising:
receiving over time, as a portion of the indication of the communication availability condition of each respective mobile device of the plurality of mobile devices, application failure information for the respective devices; and
determining that the first mobile device is likely to have the greater communication availability for the duration of the travel than the second mobile device based partially on the received application failure information indicating that the application fails less often on the first mobile device than on the second mobile device.

* * * * *